United States Patent
Karas et al.

(10) Patent No.: US 11,520,901 B2
(45) Date of Patent: Dec. 6, 2022

(54) DETECTING FIRMWARE VULNERABILITIES

(71) Applicant: VDOO CONNECTED TRUST LTD., Tel Aviv (IL)

(72) Inventors: Asaf Karas, Givatayim (IL); Meir Tsvi, Tel Aviv (IL)

(73) Assignee: JFROG LTD, Netanya (IL)

( * ) Notice: Subject to any disclaimer, the term of this patent is extended or adjusted under 35 U.S.C. 154(b) by 454 days.

(21) Appl. No.: 16/726,883

(22) Filed: Dec. 25, 2019

(65) Prior Publication Data
US 2020/0210592 A1 Jul. 2, 2020

Related U.S. Application Data

(60) Provisional application No. 62/784,867, filed on Dec. 26, 2018.

(51) Int. Cl.
*G06F 21/57* (2013.01)
*G06F 21/55* (2013.01)
*G06F 11/36* (2006.01)

(52) U.S. Cl.
CPC ........ *G06F 21/577* (2013.01); *G06F 11/3688* (2013.01); *G06F 21/552* (2013.01); *G06F 2221/033* (2013.01)

(58) Field of Classification Search
CPC .. G06F 21/577; G06F 11/3688; G06F 21/552; G06F 2221/033
See application file for complete search history.

(56) References Cited

U.S. PATENT DOCUMENTS

| | | | | |
|---|---|---|---|---|
| 10,536,482 | B2 * | 1/2020 | Gabaev | H04L 63/1425 |
| 10,558,809 | B1 * | 2/2020 | Joyce | G06N 20/10 |
| 10,706,149 | B1 * | 7/2020 | Vincent | G06F 21/566 |
| 10,817,604 | B1 * | 10/2020 | Kimball | G06F 8/73 |
| 10,817,606 | B1 * | 10/2020 | Vincent | G06F 9/45558 |
| 10,868,825 | B1 * | 12/2020 | Dominessy | H04L 63/1433 |
| 2006/0280150 | A1 * | 12/2006 | Jha | H04W 8/22 370/338 |
| 2013/0298244 | A1 * | 11/2013 | Kumar | G06F 21/51 726/25 |
| 2014/0257828 | A1 * | 9/2014 | Thornley | G06F 11/263 705/2 |
| 2017/0034023 | A1 * | 2/2017 | Nickolov | H04L 43/0817 |
| 2017/0329966 | A1 * | 11/2017 | Koganti | H04L 63/1433 |
| 2019/0129511 | A1 * | 5/2019 | Clark | G06F 3/0202 |

(Continued)

*Primary Examiner* — Joseph P Hirl
*Assistant Examiner* — Stephen T Gundry

(57) ABSTRACT

A method, system and product for detecting firmware vulnerabilities, including, during a testing phase of a firmware of a device, continuously polling states and activities of the device, wherein said polling is at a testing agent that is functionality separate from the firmware; correlating between at least one event that is associated with the states or the activities of the device and test results of the testing phase; based on said correlating, determining for the firmware one or more normal events and one or more abnormal events; and after the testing phase, providing indications of the one or more normal events and one or more abnormal events from the testing agent to a runtime agent, whereby said providing enables the runtime agent to protect the firmware from vulnerabilities associated with the one or more abnormal events.

17 Claims, 5 Drawing Sheets

```
┌────────────────────────────────────────────────────────┐
│  RECORD EVENTS TO A LOG DURING TESTING OF A FIRMWARE   │─ 110
└────────────────────────────────────────────────────────┘
                            │
                            ▼
┌────────────────────────────────────────────────────────┐
│         CORRELATE THE EVENTS WITH TESTING RESULTS      │─ 120
└────────────────────────────────────────────────────────┘
                            │
                            ▼
┌────────────────────────────────────────────────────────┐
│        DETERMINE VULNERABILITIES OF THE FIRMWARE       │─ 130
└────────────────────────────────────────────────────────┘
```

(56) References Cited

U.S. PATENT DOCUMENTS

| | | | |
|---|---|---|---|
| 2019/0163900 A1* | 5/2019 | Zhang | G06F 21/567 |
| 2019/0294536 A1* | 9/2019 | Avisror | G06F 8/433 |
| 2019/0303585 A1* | 10/2019 | Ofek | G06F 21/554 |
| 2020/0074084 A1* | 3/2020 | Dorrans | G06F 21/577 |
| 2020/0074086 A1* | 3/2020 | Bulygin | G06F 21/572 |
| 2020/0226298 A1* | 7/2020 | Appleboum | G06F 21/552 |
| 2020/0387611 A1* | 12/2020 | Yao | G06F 21/572 |
| 2021/0117544 A1* | 4/2021 | Kurtz | G06F 21/566 |

* cited by examiner

DETECTING FIRMWARE VULNERABILITIES

CROSS-REFERENCE TO RELATED APPLICATION

This application claims the benefit of provisional patent application No. 62/784,867 filed Dec. 26, 2018, which is hereby incorporated by reference in its entirety without giving rise to disavowment.

TECHNICAL FIELD

The present disclosure relates to detecting firmware vulnerabilities in general, and to methods, systems, and products of detecting firmware vulnerabilities and preventing exploitation of the vulnerabilities in real time, in particular.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion, such as 70%, of the development cycle to discover erroneous behaviors of the computerized device.

Black box testing tests a functionality of a system without observing the internal workings of the system. In comparison, white box testing is done by someone who has a clear understanding of the internals of the system.

In some exemplary embodiments, black box testing may be utilized when testing firmware. Firmware may be low-level software component which can directly access hardware. Firmware may be shipped with the hardware platform such as a computing device, or alternatively, firmware may be independently distributed.

BRIEF SUMMARY

One exemplary embodiment of the disclosed subject matter is a method comprising: during a testing phase of a firmware being executed by a device, monitoring states and activities of the device, wherein the monitoring is performed by a testing agent that is functionally separate from the firmware; recording in a log, by the testing agent, at least one event that is associated with the states or the activities of the device, and a timestamp of the at least one event; based on the timestamp of the at least one event, correlating between the at least one event and one or more results of the testing phase; and based on the correlating, determining one or more vulnerabilities of the device.

Optionally, a vulnerability of the one or more vulnerabilities is indicated by a combination of two or more recorded events in the log.

Optionally, a vulnerability of the one or more vulnerabilities indicates that at least one result of the one or more results is incorrect.

Optionally, the testing phase comprises one or more test instances having a test name, wherein the one or more results comprise the test name and testing results of the one or more test instances, wherein a timestamp of the at least one event correspond to timestamps of the one or more test instances, wherein correlating between the at least one event and one or more results comprises associating the test name with the at least one event and with the testing results.

Optionally, the method comprises, based on associating the test name with the at least one event and with the testing results, performing an analysis of the test name to determine normal and abnormal behaviors of the device during tests associated with the test name.

Optionally, the method comprises detecting normal and abnormal behaviors associated with different events of the test name, determining a baseline of abnormal behavior based on the detecting, and determining the one or more vulnerabilities based on the baseline.

Optionally, the method comprises classifying one or more test instances in the testing phase as belonging to a test type, wherein correlating between the at least one event and one or more results comprises associating the test type to testing results of the one or more test instances and to one or more events in the log, wherein the one or more events correspond to timestamps of the one or more test instances, detecting normal and abnormal behaviors associated with the test type, and determining the one or more vulnerabilities based on the normal and the abnormal behaviors.

Optionally, the states or the activities of the device comprise at least one of the group consisting of: a file access event, an input or output (I/O) event, a resource consumption event, a socket utilization event, a port utilization event, a network communication event, a permission modification event, and a process modification event.

Another exemplary embodiment of the disclosed subject matter is computer program product comprising a non-transitory computer readable storage medium retaining program instructions, which program instructions when read by a processor, cause the processor to perform the steps of: during a testing phase of a firmware being executed by a device, monitoring states and activities of the device, wherein the monitoring is performed by a testing agent that is functionally separate from the firmware; recording in a log, by the testing agent, at least one event that is associated with the states or the activities of the device, and a timestamp of the at least one event; based on the timestamp of the at least one event, correlating between the at least one event and one or more results of the testing phase; and based on the correlating, determining one or more vulnerabilities of the device.

Yet another exemplary embodiment of the disclosed subject matter is a system comprising a processor and coupled memory, the processor being adapted to perform: during a testing phase of a firmware being executed by a device, monitoring states and activities of the device, wherein the monitoring is performed by a testing agent that is functionally separate from the firmware; recording in a log, by the testing agent, at least one event that is associated with the states or the activities of the device, and a timestamp of the at least one event; based on the timestamp of the at least one event, correlating between the at least one event and one or more results of the testing phase; and based on the correlating, determining one or more vulnerabilities of the device.

One exemplary embodiment of the disclosed subject matter is a method comprising: during a first testing phase configured to test a firmware of a device with a first test having a test name, recording in a log a first parameter associated with a state of the device during the first test, and a first timestamp of the first parameter, wherein the first test comprises permitted input; during a second testing phase configured test the firmware of the device with a second test having the test name, recording in the log a second parameter associated with the state of the device, and a second timestamp of the second parameter, wherein the second test comprises forbidden input; based on the first timestamp, correlating results of the first test with the first parameter; based on the second timestamp, correlating results of the second test with the second parameter; and characterizing normal and abnormal states of the device at least based on a difference between the first and second parameters.

Optionally, the method comprises characterizing the normal states of the device to include the first parameter, and characterizing the abnormal states of the device to include the second parameter.

Optionally, the method comprises characterizing the normal and the abnormal states of the device based at least on a contradiction between the first parameter and the results of the first test.

Optionally, the method comprises identifying a vulnerability of the firmware based on characterizing the normal and the abnormal states of the device.

Another exemplary embodiment of the disclosed subject matter is computer program product comprising a non-transitory computer readable storage medium retaining program instructions, which program instructions when read by a processor, cause the processor to perform the steps of: during a first testing phase configured to test a firmware of a device with a first test having a test name, recording in a log a first parameter associated with a state of the device during the first test, and a first timestamp of the first parameter, wherein the first test comprises permitted input; during a second testing phase configured test the firmware of the device with a second test having the test name, recording in the log a second parameter associated with the state of the device, and a second timestamp of the second parameter, wherein the second test comprises forbidden input; based on the first timestamp, correlating results of the first test with the first parameter; based on the second timestamp, correlating results of the second test with the second parameter; and characterizing normal and abnormal states of the device at least based on a difference between the first and second parameters.

Yet another exemplary embodiment of the disclosed subject matter is a system comprising a processor and coupled memory, the processor being adapted to perform: during a first testing phase configured to test a firmware of a device with a first test having a test name, recording in a log a first parameter associated with a state of the device during the first test, and a first timestamp of the first parameter, wherein the first test comprises permitted input; during a second testing phase configured test the firmware of the device with a second test having the test name, recording in the log a second parameter associated with the state of the device, and a second timestamp of the second parameter, wherein the second test comprises forbidden input; based on the first timestamp, correlating results of the first test with the first parameter; based on the second timestamp, correlating results of the second test with the second parameter; and characterizing normal and abnormal states of the device at least based on a difference between the first and second parameters.

One exemplary embodiment of the disclosed subject matter is a method comprising: during a testing phase of a firmware of a device, continuously polling states and activities of the device, wherein said polling is at a testing agent that is functionality separate from the firmware; correlating between at least one event that is associated with the states or the activities of the device and test results of the testing phase; based on said correlating, determining for the firmware one or more normal events and one or more abnormal events; and after the testing phase, providing indications of the one or more normal events and one or more abnormal events from the testing agent to a runtime agent, whereby said providing enables the runtime agent to protect the firmware from vulnerabilities associated with the one or more abnormal events.

Optionally, the runtime agent is configured to utilize event hooks to detect real time events of the firmware and to compare the real time events to the provided indications to determine whether or not a remedial action is to be performed in response to the real time events.

Optionally, the runtime agent is configured to be executed on the device when the device is in a non-testing phase, wherein the runtime agent is configured to perform: classifying a real time event as normal or abnormal based on the indications, upon determining that the real time event is a normal event, ignoring the real time event, and upon determining that the real time event is an abnormal event, blocking the real time event.

Optionally, correlating between the at least one event and the test results of the testing phase is based on a timestamp.

Optionally, method comprises generating a report based on an identification by the runtime agent of a real time event in the firmware that is indicated as abnormal by the indications, wherein the report comprises recorded states and activities of the device associated with the real time event.

Optionally, the runtime agent is configured to perform: identifying a real time event using one or more event hooks; determining that the real time event was not specified in the indications from the testing agent; and reporting the real time event to enable a discovery of a new vulnerability in the firmware.

Optionally, the runtime agent is configured to monitor the states and activities of the device in a less intrusive manner than the testing agent.

Optionally, method comprises determining a type of the device; and based on the type of the device, determining a testing policy, wherein the testing phase is configured to implement the testing policy.

Optionally, the device comprises a Random Access Memory (RAM) unit and a read only storage unit, wherein the read only storage unit retains an original version of the firmware, the method comprising interrupting a boot execution of software that is retained in the read only storage unit; loading to the RAM unit, a modified version of the firmware, wherein the modified version of the firmware is a computer executable program that comprises the testing agent; and booting the modified version of the firmware, whereby executing the testing agent.

Another exemplary embodiment of the disclosed subject matter is computer program product comprising a non-transitory computer readable storage medium retaining program instructions, which program instructions when read by a processor, cause the processor to perform the steps of: during a testing phase of a firmware of a device, continuously polling states and activities of the device, wherein said polling is at a testing agent that is functionality separate from the firmware; correlating between at least one event that is associated with the states or the activities of the device and test results of the testing phase; based on said correlating, determining for the firmware one or more normal events and one or more abnormal events; and after the testing phase, providing indications of the one or more normal events and one or more abnormal events from the testing agent to a runtime agent, whereby said providing enables the runtime agent to protect the firmware from vulnerabilities associated with the one or more abnormal events.

Yet another exemplary embodiment of the disclosed subject matter is a system comprising a processor and coupled memory, the processor being adapted to perform: during a testing phase of a firmware of a device, continuously polling states and activities of the device, wherein said polling is at a testing agent that is functionality separate from the firmware; correlating between at least one event that is associated with the states or the activities of the device and test results of the testing phase; based on said correlating, determining for the firmware one or more normal events and one or more abnormal events; and after the testing phase, providing indications of the one or more normal events and one or more abnormal events from the testing agent to a runtime agent, whereby said providing enables the runtime agent to protect the firmware from vulnerabilities associated with the one or more abnormal events.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
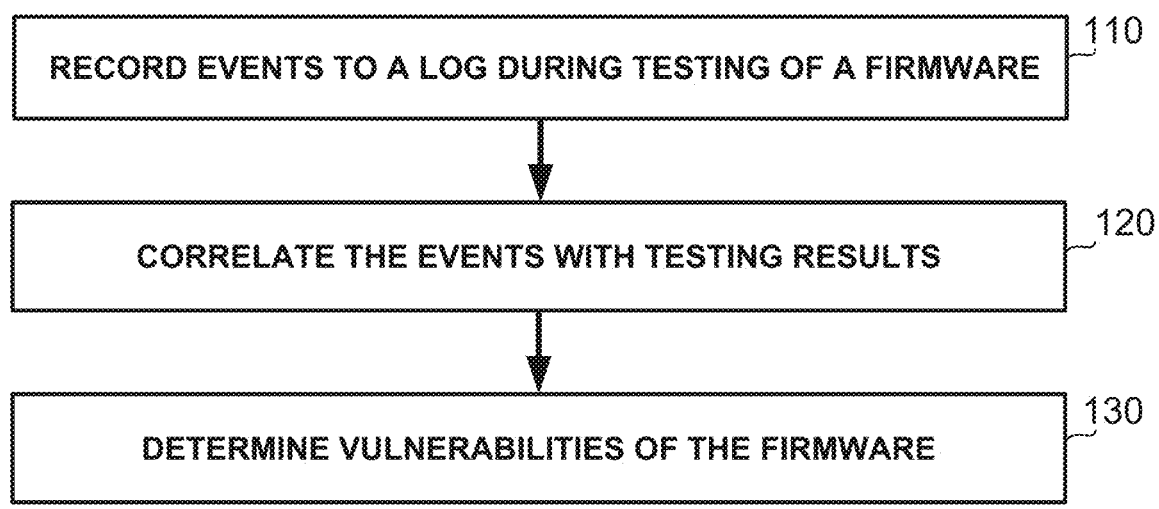
FIG. 1 shows a flowchart diagram of a method, in accordance with some exemplary embodiments of the disclosed subject matter.

One technical problem dealt with by the disclosed subject matter is to detect vulnerabilities or bugs of a firmware. Firmware may be low-level software component which can directly access hardware. In some exemplary embodiments, a vulnerability of a firmware may include a weakness of the firmware that may be exploited by a threat actor, such as an attacker or a malicious user, to perform unauthorized actions within a computer system. A vulnerability may be identified, for example, by a test that can be performed to determine whether the device functions properly, whether the device may be exploited by an attacker using the vulnerability, or the like. In some cases, testing of a device using black box testing, fuzz testing, or the like, may not sufficiently discover all bugs or vulnerabilities therein, e.g., since some bugs or vulnerabilities of the firmware may be not be covered by the tests. In some cases, if defensive programming is employed, vulnerabilities and bugs may be hidden and may not be discovered during black box testing, e.g., due to autonomous recovery being performed by the device. Additionally or alternatively, there may be side effects to the testing that the tester is unaware of, that are not visible to the testing platform, that are not examined by the testing, or the like, which may be of interest to the tester. In some cases, such side effects may include loading additional processes, deleting files, actions that can change a performance of the system, or the like. In some exemplary embodiments, the side effects may represent one or more potential or occurring attacks, one or more vulnerabilities of the device, one or more incorrect test results, or the like. In some exemplary embodiments, it may be desired to overcome the shortcomings of a black box testing, fuzz testing, or the like.

Another technical problem dealt with by the disclosed subject matter is to detect vulnerabilities of a firmware in a device such as an Internet of Things (IoT) device, e.g., without having access to the source code, source files, or the like, of the device. In some cases, users may not have full or even partial access to a firmware's code, such as in source code form or even in binary form. Such limited access to the code may increase a difficulty of finding the vulnerabilities of the firmware. For example, a user may purchase an IoT device that does not provide access to its code, and may desire to detect vulnerabilities of its firmware. In some cases, firmware vulnerabilities, e.g., in IoT devices, can be exploited by attackers to access confidential data, steal user information, inject dormant malware, or the like. In some exemplary embodiments, it may be difficult to detect vulnerabilities or bugs in firmware or firmware-based devices without having access to source code, source files, or the like, of the firmware. In some cases, the underlying operating systems and firmware of IoT devices may be difficult to modify, update, or test, as they may not be designed to run or interact with third-party applications, programs, agents, or the like. In some exemplary embodiments, it may be desired to detect vulnerabilities or bugs in firmware, where there may be limited access to the internal design and state of the device during execution.

Yet another technical problem dealt with by the disclosed subject matter is to embed extra functionality in firmware-based devices. For example, it may be desired to embed modules that run tests, modules that monitor states of the device, modules that monitor activities of the device, modules that add new functionality to the device, a combination thereof, or the like, within a firmware-based device. As an example, for an IoT device, it may be desired to embed extra functionality that enables the IoT device to record information in logs and output the logs. In some exemplary embodiments, firmware-based devices may not be compatible with incorporating extra functionality therein, e.g., since they may comprise a read only storage unit, since there may be a limit of space for installing additional software, or the like. Another obstacle may be that a boot loader of a firmware-based device may be locked, and, in some exemplary embodiments, there may be a need to run the extra functionality at boot time.

Yet another technical problem dealt by the disclosed subject matter is to provide a system for monitoring and identifying exploitations of vulnerabilities in a device during runtime. In some cases, it may be desired to identify exploitations of vulnerabilities during runtime and to protect the device against such exploitations, e.g., automatically, without requiring to manually analyze testing results to identify vulnerabilities, additional required testing, or the like, which may be time consuming, difficult, and expensive. In some exemplary embodiments, vulnerabilities of devices may be exploited by hackers and other malicious users to implement attack vectors, such as Distributed Denial of Service (DDoS) attacks. In some cases, before leaving the factory, firmware-based devices may not be sufficiently protected, thus making them vulnerable to attacks during runtime.

Yet another technical problem dealt by the disclosed subject matter is to detect new vulnerabilities during runtime. In some cases, a device may be configured to deal with known vulnerabilities during runtime, but may not know how to deal with or detect unknown vulnerabilities. As an example, a vulnerability such as a Meltdown or a Spectre vulnerability that may not be detected in a testing phase may allow a device to fully operate and perform daily tasks successfully, while being hijacked by a hacker. In such a case, the device may keep on working until the hacker decides to exploit the device, e.g., in one or more DDoS attacks, or the like. In some cases, it may take years until the vulnerability is discovered, reported, and patched. Until then, it may be very difficult to know if the vulnerability was discovered and exploited by hackers. Accordingly, it may be desired to detect such vulnerabilities or exploitation thereof in real time.

Yet another technical problem dealt with by the disclosed subject matter is to provide one or more remedial actions upon discovering a vulnerability of firmware-based devices. For example, it may be desired to prevent an attacker from exploiting the vulnerability, to patch the vulnerability, report the vulnerability, report the vulnerability type, or the like. In some cases, it may be desired to provide rich and full reports of events and states of the device that are associated with a detected vulnerability. For example, this may enable users to understand the root causes of the vulnerability and enhance efforts of preventing exploitation of the vulnerability. It is also noted that the adverse impact on the performance of the device that may be caused by the monitoring for vulnerability exploitation is also of interest and it may be desired to minimize such impact, while still providing an effective monitoring agent that prevents attacks and exploitations of the vulnerabilities of the device.

One technical solution may be to utilize a testing agent to monitor states and activities of a firmware-based device during a testing phase. In some exemplary embodiments, the testing agent may comprise a software agent, a software program, or any agent that is functionally separate from the device's firmware and is deployed during a testing phase that tests the device's firmware. The testing agent may be a general-purpose software component that is used for testing various different firmware. In some cases, the firmware may be integrated with a device such as an Internet of Things (IoT) device, a user device, or the like. In other cases, the firmware may be independent of the device.

In some exemplary embodiments, during the testing phase, the testing agent may be configured to monitor, poll, collect, or the like, the states and activities of the device, and record in a log (also referred to as "log file" and "events log") one or more events, states, activities, or parameters thereof (also referred to as "recorded events"), that are associated with the states and activities of the device. In some exemplary embodiments, the recorded events may be recorded periodically, continuously, or the like. In some exemplary embodiments, the state of the device may be investigated repeatedly and intensively, such as, 20 times per minute, once per second, 10 times per second, 30 times per second, 100 times per second, or the like. In some exemplary embodiments, the state of the device may be polled or otherwise obtained by investigating the operating system (OS) of the device, by polling the OS of the device, by monitoring operations of drivers, by monitoring processes of the device, or the like. The state of the device may be investigated irrespective of the firmware under test and without such firmware cooperating with the investigation. In some cases, the recorded events may be configured to enrich the testing results with complementary information, including additional or conflicting information. In some exemplary embodiments, the testing agent may be configured to place in the log, in addition to the recorded events, a recorded timestamp of each recorded event.

In some exemplary embodiments, the tests may be executed on the device while the testing agent is recording the internal events and states of the device. In some exemplary embodiments, the states or the activities of the device may comprise an internal event such as a file access event, an input or output (I/O) event, a resource consumption event, a change in the storage state, a socket utilization event, a port utilization event, a sensor utilization event, a network communication event, a permission modification event, a process modification event, or the like.

In some exemplary embodiments, the testing phase may be configured to implement a testing policy including the one or more tests. In some exemplary embodiments, a type of the device may be determined, and a testing policy may be determined based on the type of the device. For example, a testing policy for a first type of device such as a refrigerator, may require a different testing policy than a second type of device such as headphones. In some exemplary embodiments, tests may be executed according to the testing policy. In some exemplary embodiments, the one or more tests may be utilized to test the device's firmware, e.g., using black box testing, fuzz testing, or the like. In some exemplary embodiments, the testing agent may be configured to determine, implement, or the like, the testing policy. In some exemplary embodiments, the testing policy may be implemented by any other entity such as a user, a program, a device, a server, or the like. In some exemplary embodiments, the testing policy may include testing for specific vulnerabilities or other abnormal behavior and functionality, on one hand, and testing for normal behavior of the device, on the other.

In some exemplary embodiments, the testing phase may comprise one or more test instances having a test context such as a test name, a test type, or the like. In some exemplary embodiments, results of the testing phase may be recorded in one or more results logs, results files, or the like. The results log may comprise, for each test, the test name, testing results of the one or more test instances of the test, timestamps such as of a start time and an end time of a test, or the like.

In some exemplary embodiments, a same test context may be associated to testing results of the test instances and to recorded events in the events log. For example, a test type identified as "camera" may be associated with testing results of testing the camera of the device and with events recorded during execution of tests of the camera. In some exemplary embodiments, test instances may be classified as belonging to a test type, a test name, or the like, e.g., based on timestamps, test names, identified parameters, or the like. In some exemplary embodiments, the recorded events may correspond to timestamps of the test instances.

In some exemplary embodiments, the results log may be correlated with the recorded events in the events log, e.g., thereby creating an association of the test name with the at least one event and with the testing results in a merged file. In some exemplary embodiments, timestamps of events in the events log may be correlated with timestamps of the results log, e.g., to associate and merge results of tests with recorded events that occurred at the same time and thus provide a more complete picture of the situation. For example, timestamps of events in the events log that occurred between a start time and an end time of a test may be merged with results of the test.

In some exemplary embodiments, potential vulnerabilities and bugs of the firmware may be identified based on the merged file. In some exemplary embodiments, one or more vulnerabilities of the device may be determined, detected, or the like, based on the association of the events log with the results log. In some exemplary embodiments, a vulnerability may be indicated by one or more recorded events in the merged file. In some cases, a vulnerability may be indicated by a combination of two or more recorded events in the merged file. In some exemplary embodiments, the merged file may enable to expose vulnerabilities of the tested firmware, e.g., even if the vulnerabilities were not visible and were not detectable from the testing results themselves.

In some exemplary embodiments, a vulnerability of a firmware may refer to a weakness of the firmware that may be exploited by a threat actor, such as an attacker, a malicious user, or the like. As an example, vulnerabilities of a firmware may include Common Vulnerabilities and Exposures (CVE) vulnerabilities that may be defined in a CVE system. In other exemplary embodiments, a firmware may have any other type of vulnerabilities. In some exemplary embodiments, vulnerabilities, security issues, or the like may be reported to the user via a report, an alert, a warning, a security warning, or the like.

In some exemplary embodiments, the merged file, which may correlate the results log with the testing agent's events log, may enable to identify one or more normal events of the firmware or patterns thereof and one or more abnormal events of the firmware or patterns thereof, also referred to as normal behavior and abnormal behavior, respectively. In some exemplary embodiments, the determined normal and abnormal behaviors may be associated with different events of a same test name or type. In some exemplary embodiments, for each test name or test type, an analysis may be performed on associated recorded events and testing results, to detect normal and abnormal behaviors of the device during tests associated with each test name or test type. In some exemplary embodiments, the normal and abnormal behaviors of the firmware may be based on whether or not differences are detected in the firmware's recorded behavior during similar or identical tests. In some exemplary embodiments, for each test name or type, a baseline of abnormal behavior, normal behavior, or the like, may be determined based on the different events, testing results, or the like, associated with the test name or type. In some exemplary embodiments, one or more vulnerabilities may be determined based on the baseline of abnormal behavior, based on the baseline of normal behavior, or the like. It is noted that in some cases, the test results themselves may indicate whether or not the firmware is susceptible to a vulnerability. However, the behavior information may be useful to characterize the state of the device when there is an attempt to exploit such vulnerability. In some exemplary embodiments, the testing phase may comprise a plurality of phases associated with a plurality of different tests. In some exemplary embodiments, one or more first testing phases may be configured to test the device's firmware with permitted or acceptable input, while one or more second testing phases may be configured to test the device's firmware with forbidden or unacceptable input. In some exemplary embodiments, during the one or more first testing phases, a plurality of tests of a plurality of types comprising permitted input may be utilized, while during the one or more second testing phases, a plurality of tests of a plurality of types comprising forbidden input may be utilized. In some exemplary embodiments, both first and second testing phases may utilize at least some identical test types having same test names. For example, a "camera" test template may be utilized three times by three test instances during a first testing phase, and two times by two test instances during a second testing phase. Additionally or alternatively, the testing phases may be implemented in any order therebetween, such as in any sequence therebetween, in parallel, or the like. For example, a sequence of testing phases may include two second testing phases, followed by four first testing phases, followed by two parallel second testing phases. In other cases, the sequence of testing phases may include any other order.

In some exemplary embodiments, the baseline of normal behavior of the firmware may be utilized to create a "whitelist", which may comprise one or more indications or listings of normal events, a context thereof, characterizations thereof, or the like, and the baseline of abnormal behavior of the firmware may be utilized to create a "blacklist", which may comprise one or more indications or listings of abnormal events, a context thereof, characterizations thereof, or the like. In some exemplary embodiments, the whitelist and blacklist may characterize, describe, indicate, or the like, a certain situation that is associated with a test type or name, but without directly mentioning test names or types. For example, the blacklist may indicate a "camera" test type that utilizes 73% of the CPU by listing an event of invoking a camera library while utilizing more that 70% of the CPU, as an abnormal event. This way, the whitelist and the blacklist may enable to detect occurring events and classify them based on determined information from the testing phase, after the testing phase.

In some exemplary embodiments, during the one or more first testing phases, a first test which may be of a certain test type, test name, or the like, may be utilized to test the device's firmware. In some cases, the first test may include permitted input. In some exemplary embodiments, during the one or more second testing phases, a second test which may be of the same test type, test name, or the like, as the first test, may be utilized to test the device's firmware. In some cases, the second test may include forbidden input.

In some exemplary embodiments, during the one or more first and second testing phases, the testing agent may be configured to continuously monitor and collect information associated with the states and activities of the device. In some exemplary embodiments, the testing agent may be configured to record in the events log at least one first parameter, event, or activity associated with the states and activities of the device during the first test, and at least one second parameter, event, or activity associated with the states and activities of the device during the second test. In some cases, the first and second parameters may indicate one or more events, states, activities, or the like, of the device. In some exemplary embodiments, the first parameter may be recorded with at least one first timestamp of the first parameter, and the second parameter may be recorded with at least one second timestamp of the second parameter. In other exemplary embodiments, any other number of parameters, events, or activities associated with the states and activities of the device may be recorded.

In some exemplary embodiments, results of the first test may be correlated with the first parameter, e.g., based on the first timestamp, and results of the second test may be correlated with the second parameter, e.g., based on the second timestamp. In some exemplary embodiments, since both first and second parameters are associated with the same test type or test name, the first parameter may indicate a behavior of the device that corresponds to acceptable input, and the second parameter may indicate a behavior of the device that corresponds to unacceptable input.

In some exemplary embodiments, for each test name or type, normal and abnormal states or behaviors of the device may be characterized based on parameters or events recorded during each utilization of the test name or type, based on the type of input to the test such as acceptable or unacceptable, or the like. In some cases, a baseline of what is considered normal behavior may be formulated based on events recorded in response to acceptable input, corresponding test results, or the like, while a baseline of what is considered abnormal behavior may be formulated based on events recorded in response to unacceptable input, corresponding test results, or the like.

In some exemplary embodiments, the normal and abnormal states of the device may be characterized based on the first and second parameters. In some exemplary embodiments, a difference between the first and second parameters may be utilized to characterize normal and abnormal states of the device. In some cases, the normal states of the device may be characterized to include the first parameter, and the abnormal states of the device may be characterized to include the second parameter. As an example, if a "camera" test is executed, and during the first testing phase the testing agent records that the CPU utilization is 2%, and during the second testing phase the testing agent records that the CPU utilization above 70%, the testing agent may characterize normal behavior during a "camera" test as having a low utilization of the CPU, and abnormal behavior during a "camera" test as having a high utilization of the CPU. For example, a threshold of around 2% of the CPU, e.g., 4%, may be determined as a maximum threshold for normal behavior during a "camera" test, and a threshold of around 70% of the CPU, e.g., 60%, may be determined as a minimum threshold for abnormal behavior during a "camera" test.

In some exemplary embodiments, a difference between the first or second parameter and the corresponding test results, e.g., indicating a contradicting result, may be utilized to characterize normal and abnormal states of the device. For example, a test with acceptable inputs that results with the correct output such as "success" in the results log may contradict recorded events that may describe problematic side effects or prove that the test failed. Accordingly, the recorded events may be used to characterize abnormal states of the device instead of normal states of the device.

In some exemplary embodiments, a plurality of first parameters may be collected for different instances of the first test, and a plurality of second parameters may be collected for different instances of the second test. In some cases, the normal states of the device may be characterized according to an average, a frequency, a standard deviation, or the like, of the plurality of first parameters, and the abnormal states of the device may be characterized according to an average, a frequency, a standard deviation, or the like, of the plurality of second parameters. In some exemplary embodiments, the normal and abnormal states of the device may be utilized to identify at least one vulnerability of the firmware.

Another technical solution may be to provide a computer program product for runtime analysis (referred to as a "runtime agent"). In some exemplary embodiments, the runtime agent may comprise a software agent, a software program, or any agent that is functionally separate from the device's firmware. In some exemplary embodiments, the runtime agent may be deployed after the testing phase is completed, when the device is in the field, during a production phase, or the like. In some exemplary embodiments, the runtime agent may be used in normal usage of the device outside of the testing environment. In some exemplary embodiments, the runtime agent may be configured to be executed on the device when the device is in a non-testing phase, e.g., after the testing phase. In some exemplary embodiments, the runtime agent may be employed instead of or in addition to the testing agent.

In some exemplary embodiments, the runtime agent may be a runtime component that is utilized to continuously monitor anomalous behavior. In some exemplary embodiments, the runtime agent may be specifically tailored to the firmware and may not be a general-purpose computer program product. Additionally or alternatively, the runtime agent may be configured to protect the firmware against exploitation of the vulnerabilities that were detected by the testing agent, e.g., during an execution of the firmware on the device. In some exemplary embodiments, the runtime agent may retain a description of normal and abnormal behaviors. Such description may be obtained and determined based on the monitored events recorded by the general-purpose testing agent.

In some exemplary embodiments, after the testing phase, a whitelist, including indications or listings of the one or more normal events, characterizations thereof, or the like, may be provided to the runtime agent. Additionally or alternatively, a blacklist, including indications or listings of the one or more abnormal events, characterizations thereof, or the like, from the testing agent may be provided to the runtime agent. In some exemplary embodiments, the whitelist or blacklist may enable the runtime agent to protect the firmware from vulnerabilities associated with the one or more abnormal events or from vulnerabilities associated with undefined events. In some exemplary embodiments, the runtime agent may be configured to detect real time events and determine, based on the provided whitelist or blacklist, whether they match a normal behavior pattern or not. In some exemplary embodiments, upon determining that events are not normal, e.g., when they do not match the whitelist, the runtime agent may block such events, associated processes, or the like, and prevent them from being implemented. Hence, the runtime agent may prevent utilization of unknown behavior patterns for malicious purposes. Additionally or alternatively, if events match known abnormal behavior patterns, as described in the blacklist, malicious activity may be identified and reported in real time. By preventing all non-whitelist behavior, high security standard is achieved, which is likely acceptable for IoT devices that have relatively simple and repetitive behavior patterns. By providing specific reports regarding blacklisted events, a rate of false positive reports may be reduced to an acceptable rate for a human operator. Additionally, or alternatively, the runtime agent may report the events, in real-time, in retrospect, periodically, or the like. In some exemplary embodiments, the runtime agent may obtain updated blacklists and whitelists regularly, upon an event, upon determination of a third party that an updated list is available, or the like.

In some exemplary embodiments, the runtime agent may be configured to monitor the states and activities of the device in a less intrusive manner than the testing agent, e.g., to identify abnormal events or undefined events without adding a significant burden on the resources of the device, such as computational power, memory, or the like. In some exemplary embodiments, to reduce a computational cost, the runtime agent may be configured to utilize event hooks, register to library callbacks, register to new processes, sample states and activities of the device, monitor continuously or more frequently only potentially critical events such as system processes, or the like, to detect or identify real time events of the firmware without performing continuous polling and recording. In some exemplary embodiments, the event hooks may be inserted in a binary of the firmware of the device, or in any other binary of the device. In some exemplary embodiments, the runtime agent may sample states and activities of the device every time period such as every three seconds, every second, or any other sampling frequency. In some exemplary embodiments, the sampling frequency may be predetermined or dynamically determined, e.g., based on a utilization of resources by the runtime agent. In some cases, a statistical model may be utilized to evaluate a full situation of the device based on the sampled parameters. For example, the runtime agent may sample ongoing processes with a certain frequency, e.g., every second, and upon identifying that this sampling rate utilizes too much of the CPU, a sampling frequency may be reduced to only once every three seconds, or the like. Additionally or alternatively, the manner of detecting events by the runtime agent may be different than that of the testing agent. In some exemplary embodiments, the testing agent may employ more intrusive techniques than the runtime agent. Additionally or alternatively, the testing agent may create a greater burden on the resources of the device than the runtime agent. In some exemplary embodiments, the testing agent may also be used to monitor expected performance of itself during normal and abnormal behavior. During such monitoring, the testing agent may employ a lesser intrusive technique than that employed when analyzing functional operation during normal and abnormal behavior, e.g., without using intrusive event hooks. In some exemplary embodiments, during performance profiling, the testing agent may employ similar techniques to those of the runtime agent, or employ polling technique that are performed in reduced frequency, so as to provide performance measurement that can be utilized by the runtime agent as relevant baselines.

In some exemplary embodiments, detected real time events may be compared to the whitelist and blacklist from the testing agent to determine whether or not a remedial action is to be performed in response to the real time events, whether or not the events should be recorded, or the like. In some exemplary embodiments, the runtime agent may be configured to classify the real time events as normal or abnormal, e.g., based on the lists, the context of the real time events as indicated by the lists, or the like. In some cases, upon determining that the real time event is a normal event, the runtime agent may ignore the real time event, not record anything during its occurrence, not perform remedial actions, or the like. In some cases, upon determining that the real time event is not a normal event, the runtime agent may record states of the device, and perform remedial actions such as blocking the real time event, blocking associated processes, reporting the event with the recorded states, providing an alert, or the like. For example, if an attempt to open a port 998 is identified and is considered an abnormal event as the normal behavior is only related to port 80, then the runtime agent may prevent the port from being opened, may close the port, block communications from port 998, or the like. As another example, if a packet is transmitted to a server named "badserver.com", and is considered as an abnormal event as all transmissions are normally sent to "goodserver.com", then the transmission to and from "badserver.com" may be blocked. Other I/O operations may be blocked, undone, or otherwise prevented.

In some exemplary embodiments, upon determining that a real time event in the firmware is not a normal event, a report may be generated based on an identification by the runtime agent that the real time event is indicated as abnormal by the blacklist or is not indicated as normal in the whitelist. In some exemplary embodiments, the report may be reported to a user, a producer of the runtime agent, or the like. In some exemplary embodiments, the report may comprise information recorded by the runtime agent during the real time event, as well as information from the lists obtained from the testing agent. For example, a report may comprise recorded states of the device, recorded activities of the device, testing results, or the like, which are associated with the real time event.

In some exemplary embodiments, the report may be submitted in real time upon identifying the event, at a predetermined offset from the identification of the event, at predetermined periods that do not depend on the identification of the event, or the like, e.g., by sending an e-mail, a notification, or the like. In some exemplary embodiments, sending information to the user, the producer of the runtime agent, or the like, may be performed in addition to or instead of performing a remedial action such as blocking the process that started the abnormal event, blocking the connection that is using the abnormal port, reporting to the producer of the runtime agent, reporting to the user regarding the abnormal event, or the like.

In some exemplary embodiments, an unspecified real time event that is not specified in both lists may be reported to a user, a producer of the runtime agent, or the like, to enable a discovery of a new vulnerability in the firmware. In some exemplary embodiments, the report of the unspecified real time event may comprise only information recorded by the runtime agent during the real time event. Upon receiving the report regarding the problematic event, the producer of the runtime agent may send some mitigation actions, remedial actions, or the like, to the device, to an associated server, or the like. As an example, a new vulnerability may be discovered after the runtime agent is installed. The new vulnerability may use a special port, a special process, or the like, which was not specified by the lists. Upon receiving the notification, the producer of the runtime agent may determine that some remedial actions should be performed and send instructions regarding the needed remedial actions to the device. The remedial actions may comprise actions such as reinstalling drivers, re-obtaining some files, applying patches, a combination thereof, or the like. Sending the remedial actions may be performed by pushing new libraries to the device, by alerting the user, or the like. It is noted that in some cases, all unspecified real time event may be blocked, and reported for analysis post-factum. Based on the analysis, such events may be classified as normal and allowed if they occur again in the future. Additionally or alternatively, based on the analysis, the events may be classified as relating to malicious activity and added to the blacklist. In such a case, if the events occur again in the future they may be reported in real-time in addition to being blocked or otherwise prevented.

In some cases, the producer of the runtime agent, a user, or the like, may provide a server for handling reports and for performing responsive remedial actions. In some cases, reports and responsive remedial actions may be handled by the firmware-based device, by a user device, or the like. In one example, the producer of the runtime agent may determine mitigation actions for a new vulnerability that is configured to be patched at future update of the firmware of the device. According to this example, since the device is vulnerable until the scheduled update, mitigation actions may be handled by the server and utilized to reduce a severity of the vulnerability, to patch the vulnerability, or the like.

Another technical solution may be to add monitoring software such as the testing agent or the runtime agent to the device, when copying an executable of the monitoring software to the device is not enabled. In some exemplary embodiments, the firmware-based device may comprise a Random Access Memory (RAM) unit and a read only storage unit. In some exemplary embodiments, the read only storage unit may retain software including an original version of the firmware in a read-only memory region, which may not be modified. In some cases, the device may not enable any modification to its system, such as adding an executable of the monitoring software to the system, e.g., since the device may include a read-only storage unit.

In some exemplary embodiments, to address this issue, the device's software may be dumped or copied, e.g., to a server, another device, the RAM unit of the device, or the like, by using one or more hardware extraction tools. In some exemplary embodiments, the device's software may include the kernel of the device, the drivers of the device, the firmware and software that may perform the device designated operations, or the like. In some exemplary embodiments, the monitoring software may be inserted to the dumped software, e.g., to provide a modified version of the software.

In some exemplary embodiments, after dumping the device's software, the modified version of the firmware, e.g., including the testing agent's executable, may be loaded to the RAM unit. In some exemplary embodiments, the modified version of the firmware may comprise a computer executable program that comprises the testing agent, the runtime agent, or the like.

In some exemplary embodiments, a boot loader of the software may be retained in the read only storage unit of the device. In some exemplary embodiments, after powering on the device, the execution of the boot loader may be stopped, interrupted, or the like. Upon booting the device, the boot execution may be interrupted to replace the software with a modified software, which may be obtained from an external storage such as a server, a USB memory stick, or the like. The modified version of the software may be booted, e.g., thereby executing the testing agent. In some exemplary embodiments, upon a next booting of the device, the original, non-modified software may be loaded.

Another technical solution may be to add monitoring software such as the testing agent or the runtime agent to the device, when copying an executable of the monitoring software to the device is enabled, unlocked, or the like. In some exemplary embodiments, a firmware-based device may not be restricted by a vendor lock-in, and may enable to copy software to its storage unit. In some exemplary embodiments, a firmware-based device may have a Shell script without a password, enabling third party users to use the Shell script. In some exemplary embodiments, the monitoring software may be inserted to device, and executed together with the firmware of the device. In some exemplary embodiments, after inserting the monitoring software to the device, the device may be modified so that further modification will be disabled or made more difficult. For example, a password may be added to the shell script, a lock-in may be employed, or the like.

One technical effect of the disclosed subject matter may be enabling detection of firmware vulnerabilities without having access to source code of the firmware which may be unavailable, difficult to obtain, difficult to analyze, or the like. In some exemplary embodiments, this may be the case for various reasons, e.g., when the firmware is provided without access to its code.

Another technical effect of the disclosed subject matter may be providing a testing agent which may enhance a testing phase and enable to discover additional bugs or vulnerabilities in the firmware. In some cases, if defensive programming is employed, the testing agent may discover hidden vulnerabilities and bugs that may not be discovered during black box testing.

Yet another technical effect of the disclosed subject matter may be providing a testing agent that is general-purpose that is used to specifically tailor a runtime agent that is generated specifically for the firmware.

Yet another technical effect of the disclosed subject matter may be to enable a third-party that is not the developer of the firmware or device to create, define and implement a security policy in an automated or semi-automated manner. The security policy may allow certain operations and prevent others. The security policy may be a security policy for a specific type of device or firmware and may be implemented on all instances of devices of the same type.

Yet another technical effect of the disclosed subject matter may be providing a runtime agent which may block and report any problematic events occurring during runtime. In some exemplary embodiments, the runtime agent may be utilized for monitoring and identifying vulnerabilities in a device during runtime and to protect the device against potential exploitation of the vulnerabilities during runtime. In some exemplary embodiments, the runtime agent may be memory efficient, power efficient, computationally efficient, or the like. In some exemplary embodiments, the runtime agent may provide one or more remedial actions upon discovering a vulnerability of firmware-based devices, such as blocking the associated event, patching the vulnerability, reporting the vulnerability, or the like.

Yet another technical effect of utilizing the disclosed subject matter is to embed extra functionality in firmware-based devices, e.g., by dumping device's software and inserting the testing agent, the runtime agent, or the like. This unique method enables to insert both testing agent and runtime agent in dumped software of the device, thus providing extra functionality that may be otherwise difficult to embed in a firmware-based device, and eliminating a dependency on available storage space of the device.

Yet another technical effect of utilizing the disclosed subject matter is to detect new vulnerabilities during runtime. In some exemplary embodiments, the runtime agent may identify any abnormal or undefined event in the device. Such detections may be utilized to determine new vulnerabilities of the firmware that were not detected during the testing phase, and to reduce exploitation of unknown vulnerabilities.

Yet another technical effect of utilizing the disclosed subject matter is to enhance the report of vulnerabilities to clients and make it more particular and efficient. In some cases, upon identifying an abnormal event, a report including recorded information as well as testing results associated with the abnormal event may be provided. This may save time and improve resource utilization of a computerized framework.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing a flowchart diagram illustrating a method in accordance with some exemplary embodiments of the disclosed subject matter.

On Step 110, the testing agent records events to an events log during a testing phase. In some exemplary embodiments, the device may be tested while the testing agent is logging information. As an example, for events such as Input/Output (I/O) operations or attempts to make I/O operations, the testing agent may poll the device's file system and receive notifications or call backs when there is an attempt to read or an attempt to write to the file system. The testing agent may further record whether the attempt succeeded or failed. Additionally or alternatively, the testing agent may monitor events such as an attempt to read from the network card of the device, an attempt to write to the network card of the device, or the like. In some exemplary embodiments, the device may comprise an IoT device which may comprise a camera or other sensors such as but not limited to a humidity sensor, a Global Positioning System (GPS) sensor, a microphone, a gyroscope, an accelerometer, or the like. The testing agent may record events from any such sensors. In some exemplary embodiments, recording of events from a sensor may be done by registering on the driver of the sensor and waiting for a callback.

In some exemplary embodiments, one or more libraries or other third-party packages that the device uses may be known. In such embodiments, some of the libraries may be replaced with replacement libraries that include wrappers. The wrapper may be configured to record events as they occur, e.g., when the libraries are invoked. For example, whenever a GPS library is invoked, the state of the device may be recorded. Additionally or alternatively, whenever a camera library is invoked, a camera usage event may be logged. In some exemplary embodiments, recording of the events using the wrappers may be in addition to or instead of the monitoring performed by a stand-alone testing agent.

In some exemplary embodiments, the testing agent may record events that occur during execution of the device's firmware. In some cases, the events may include, for example, accesses to files such as writing to files, trying to write to files, deleting files, trying to delete files, reading from files, trying to read from files, or the like; device characteristics, such as Central Processing Unit (CPU), Input/Output (I/O), page swaps, or the like; resource consumption such as CPU utilization (e.g., overall, per process, or the like), Random Access Memory (RAM) utilization, network utilization, or the like; network connections that the device is opening or closing; network activity counters; how many packets are being sent and received; ports that the device is opening or closing, how those ports are being used—i.e. for listening and for receiving or for sending, which protocol is being used, payload per port, or the like; services that are being loaded by the device; what processes are being started and stopped by the device; what priority those processes have; packages that the device is communicating with, exceptions thrown by the device; network communication—both egress and ingress; changes in permissions; users' login/logout activities; whether the device is plugged to an electrical socket; plug/unplug event; drivers loading/unloading; changes in firewall rules; or the like. Additionally or alternatively, the testing agent may detect if there is a secure storage device and if so, it may check that all data is written only to this storage device. Additionally or alternatively, the testing agent may find unauthenticated endpoints/routes. Additionally or alternatively the testing agent may find sensitive data inside log files. Additionally or alternatively, the testing agent may identify unsafe services or services that should not ever load. Additionally or alternatively, the testing agent may copy logs from the device. Such logs may be system logs, application logs, security logs, or the like. Additionally or alternatively, the testing agent may check if the data that is being written to the storage device is encrypted or not. Additionally or alternatively, the testing agent may record the state of encryption and record if that state changes. i.e. if the testing agent determined that new data is encrypted on the storage device and the testing agent sees a new file that is not encrypted it may record such an event. Vice versa should also be recorded: if the testing agent determined that new data is not encrypted on the disk and the testing agent sees new file that is encrypted then the testing agent may record such an event. Additionally or alternatively, the testing agent may record signatures of processes. In some cases, the testing agent may record events where processes of the same name have different signatures. In some exemplary embodiments, the testing agent may record activations of Operating System (OS) status commands, such as commands relating to processes running, drivers loaded, memory used, CPU used, network connection opened, network activity counters, or the like. Additionally or alternatively, OS status commands may be utilized by the testing agent to identify the state of the device and the events. In some exemplary embodiments, when recording events regarding access to files, additional information may be recorded. Such additional information may include the file name, the file path, what was written, what was read, or the like.

In some exemplary embodiments, based on the monitoring activity of the testing agent, a list of all recorded events that the testing agent recorded may be compiled. In some exemplary embodiments, the identified events may be recorded to an events log file which may be located on the device, on a remote cloud server, on a local server, or the like. In case that the events log is not in the device, writing in the events log may be done by Remote Procedure Call (RPC), or by any other procedure. In some cases, the testing agent may save the events log on the device, and, when the file size exceeds a predetermined threshold, the testing agent may send the events log to a server and delete the events log from the device, thus allowing to save space on the device.

In some exemplary embodiments, testing the device may comprise exposing the device to inputs such as sensor-based inputs and examining the output, e.g., using fuzz testing, black box testing, or the like. As an example, a device that is configured to monitor temperatures may be placed in a room with an active air condition. It may be expected that the device's thermostat will respond to the temperature change and that the device may take an action followed by the change in the temperature (e.g. invoke an RPC in order to turn off the air condition or send data regarding the change). During the test, when the air condition is turned on, the state of the device may be recorded and the events log may comprise a record regarding the internal response of the device to the temperature change. In some exemplary embodiments, reports generated based on the testing agent's activity may or may not be provided once all tests are executed and completed, on a per-test basis, or the like.

In some exemplary embodiments, fuzz testing may be employed to test the device, e.g., from a remote location. In some exemplary embodiments, fuzzing may be performed to provide variations of potential inputs, provided by a web server, to the IoT device. In some exemplary embodiments, the IoT device may react to the input received from the web server and perform intended or unintended actions, events, functionality, or the like. The testing agent may monitor the state of the device while responding to the inputs provided from the web server, and record at least some of the intended and unintended functionality. In some cases, it may be possible to access the device by using remote commands, such as using Secure Shell (SSH) commands, telnet commands, via an Application Programming Interface (API), or the like. The results of the fuzz testing may be written to a results file or log, which may be different than the events log of the testing agent.

In some exemplary embodiments, black box testing may be performed to test the device. The black box testing may be performed by sending inputs or commands to the device, e.g., to initiate different operations such as to process data, upload the results of the processing to a server, download a configuration file, or the like. As an example, a device that is configured to monitor crops, may receive images of crops, process them and send the results to a server. The results of the black box testing may be written to a results file or log, which may be different than the events log of the testing agent.

On Step 120, recorded events may be correlated with testing results. In some exemplary embodiments, each test that is being executed may have one or more names, types, or the like, such as "camera", "home", "temperature", or the like. In some cases, a test may have multiple names, while each test name may not be unique. In some exemplary embodiments, the correlation of the events log with the results log may be based on one or more test names, test types, or the like, which may be matched using corresponding timestamps. In some exemplary embodiments, timestamps indicating a time of occurrence of each event may be added to the testing agent's output, e.g., the events log, and to the testing phase's output, e.g., the results log. In some cases, the timestamps may be added to the events log by the testing agent. Additionally or alternatively, the timestamps may be added by an external entity to the testing agent, such as but not limited to the testing phase, a testing server, by a human tester, or the like.

In some exemplary embodiments, the events log and the results log may be merged in a merged file to create a full list of events that occurred during the testing phase. In some exemplary embodiments, the events log may be correlated with the tests' results, e.g., the black box test results, the fuzzing test results, or the like. In some exemplary embodiments, the events log of the testing agent may be merged with outputs of the tests, e.g., by comparing the time stamps in each of the files. The merged file may include tests names, outputs of the tests, results of the tests, outputs of processing operations, events that were recorded by the testing agent during the tests, a combination thereof, or the like.

In some exemplary embodiments, the merged file may be processed to form a whitelist of normal events and a blacklist of abnormal events. In some exemplary embodiments, each set of one or more subsequent events from the merged file may be added either to the whitelist or to the blacklist. In some exemplary embodiments, each event and operation that was recorded during the testing phase and classified as a normal, acceptable, permitted event, may be added to the whitelist, while each event and operation classified as an abnormal, unacceptable, forbidden event, may be added to the blacklist. The whitelist may include a set of permitted events, permitted Internet Protocol (IP) addresses, permitted device ports, or the like. In some exemplary embodiments, the blacklist may include events and activities that are forbidden, which may be part of a malicious activity, forbidden IP addresses, forbidden device ports, or the like. In some cases, a single event may be classified as potentially abnormal, if the event is permitted by itself but forbidden if followed by one or more subsequent events. For example, a first event of writing to a file may be permitted by itself, but if in the context of writing to the file, the writing to the file is followed by changing a name of the file, the event may be considered forbidden. According to this example, the first event may be considered potentially abnormal, as it creates a context that includes potential abnormal activity. In some exemplary embodiments, the black and whitelists may be utilized by a runtime agent executed on a device, so as to prevent unauthorized operations, identify malicious activity, or the like.

In some exemplary embodiments, a processing software, e.g., at a server, at the device, or the like, may process the merged file, the events log of the testing agent, the results log, or the like, and execute instructions or commands based thereon. Referring to the above mentioned air conditioner test example, assuming that the temperature test begun at time Nov. 21, 2018-15:06, the processing software may execute a command such as "execute cat blackbox.out |grep Nov. 21, 2018-15:06 |grep TEMPERATURE". This line, when executed, allows to find the word "TEMPERATURE" during the start time of the test in the merged file. In some exemplary embodiments, the results log may include information such as "Nov. 21, 2018-15:06 AIR CONDITION TEST START, Nov. 21, 2018-15:07 SUCCESS". The events log of the testing agent may include information such as "Nov. 21, 2018-15:07 THERMOSTAT SIGNAL 5 DEGREES, Nov. 21, 2018-15:07 PORT 8080 IS OPEN, Nov. 21, 2018-15:07 DATA SENT TO 192.168.0.11". After processing the events log and merging the results log therewith, a merged file may include information such as "Nov. 21, 2018-15:06 AIR CONDITION TEST START, Nov. 21, 2018-15:07 THERMOSTAT SIGNAL 5 DEGREES, Nov. 21, 2018-15:07 PORT 8080 IS OPEN, Nov. 21, 2018-15:07 DATA SENT TO 192.168.0.11, Nov. 21, 2018-15:07 SUCCESS".

In some exemplary embodiments, the testing agent may write, in addition to writing events to the events log, additional information such as test descriptions, commands that may be identified at the beginning and in the end of a test, instructions on how to process the test, events to search for, a combination thereof, or the like. In some cases, the testing agent may implement a Remote Procedure Call (RPC) Application Programmer Interface (API). According to this example, the testing agent may further add to the events log instructions on how to process the events log. In some exemplary embodiments, once the testing is completed, the events log may be retrieved from the device in order to examine the results of the testing.

In some exemplary embodiments, the testing agent may run the tests by itself. In such cases, the testing agent may prepare test files that define the tests to include a list of inputs, commands, outputs, or the like. The testing agent may execute the commands using a scripting language such as Bash, Perl, Python, or the like. When the tests are completed, the testing agent may save the results of the tests in log files on a local storage or send the results to a server such as a remote server. During the execution of the tests, the testing agent may periodically or continuously record the device's state and save it as a means to determine normal and abnormal behavior of the device. In other exemplary embodiments, a server, a manual tester, or any other party may run the tests.

On Step 130, vulnerabilities of the firmware are determined. In some exemplary embodiments, events recorded in the merged file may indicate, alone or in combination with other recorded events, a vulnerability. In some exemplary embodiments, vulnerabilities may be determined based on the device failing in a test, based on determined baselines of the events, based on a failure of a test that is indicated in the events log but not in the results log, based on a contradiction between the events log and the results log, or the like. For example, if the device is writing to a system file, such an event may indicate that there is a vulnerability. As another example, if, when running in one user space the device is accessing files of another user, such an event may indicate that there is a vulnerability. As another example, if the CPU usage or the RAM usage is above some predetermined threshold then it may indicate that there is a vulnerability or that the hardware of the device does not adequately support the operation.

In some exemplary embodiments, events in the merged file may be classified as normal, potentially abnormal, or abnormal based on user input, based on determined baselines, based on associated inputs, based on testing techniques, based on heuristics, or the like.

In some exemplary embodiments, the user may determine or select which vulnerabilities or events he wishes to protect, block, or the like, and in what manner. For example, a user may manually or automatically review the list of events and indicate which of them should be prohibited. The prohibited events may be monitored for during runtime to prevent exploitation of associated vulnerabilities or other adverse effects of bugs. Additionally or alternatively, vulnerabilities may be selected automatically based on heuristics such as requirements of a certain certification process, which may require a subset of vulnerabilities to be handled.

Figure 2:
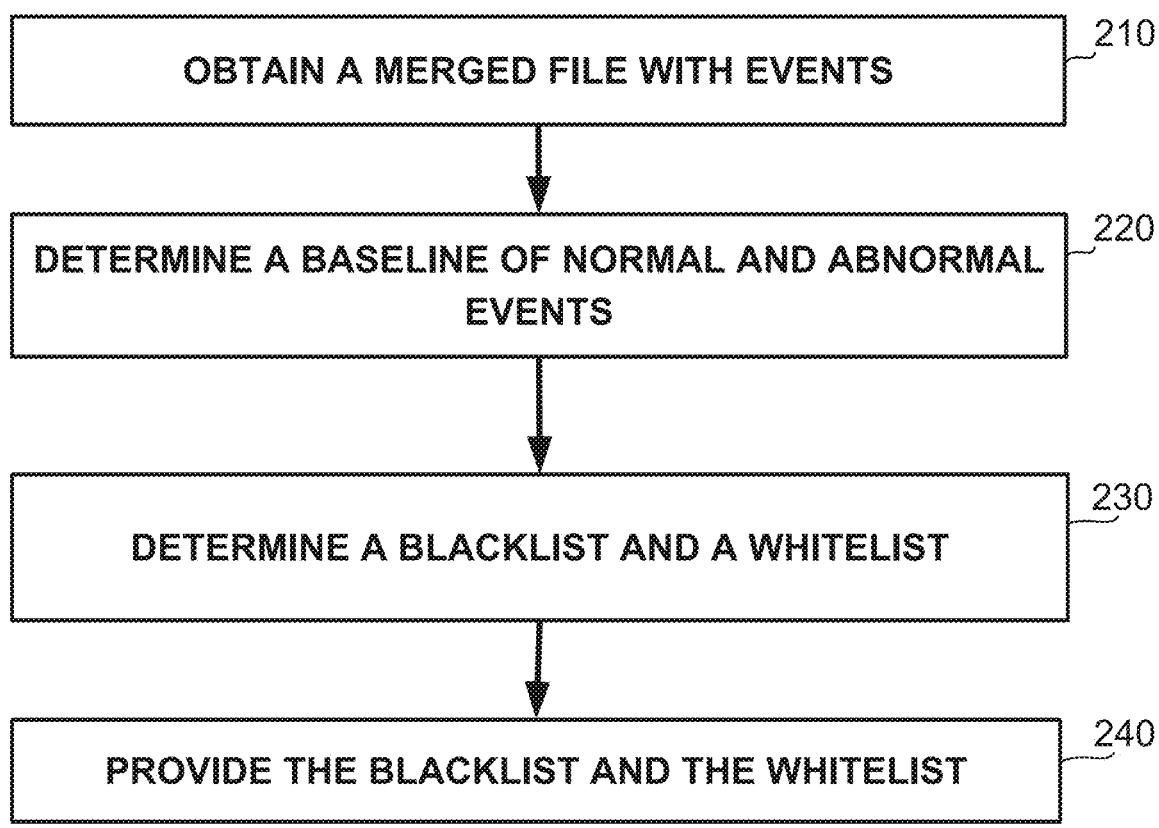
FIG. 2 shows a flowchart diagram of a method, in accordance with some exemplary embodiments of the disclosed subject matter.

Referring now to FIG. 2 showing a flowchart diagram illustrating a method in accordance with some exemplary embodiments of the disclosed subject matter.

On Step 210, a merged file may be obtained. In some cases, the merged file may comprise a merging of an events log, recorded by a testing agent during a testing phase of a device, and a results log, recording results of the testing phase. In some exemplary embodiments, the merged file may include one or more indications, pointers, listing, or the like, that associate between the events log and the results log. In some exemplary embodiments, the merged file may associate, for each test that was performed, a name or type of the test, a result of the test, a timestamp of the test, or the like, with recorded internal events that occurred in the device during the test.

On Step 220, based on the merged file, a baseline of "normal" events and "abnormal" events may be created. In some exemplary embodiments, normal or abnormal behavior baselines may be identified in relation to the test names or types. In some exemplary embodiments, a plurality of entries of the merged file that correspond to a single test name may be identified. In some exemplary embodiments, the plurality of entries may be classified to first tests that included permitted input, and to second tests that included forbidden input. In some exemplary embodiments, a behavior of the device during the first tests, e.g., as found in the merged file, may be used to characterize a normal baseline, while a behavior of the device during the second tests may be used to characterize an abnormal baseline. In some cases, the normal baseline may be characterized according to an average, a frequency, a standard deviation, or the like, of different behaviors of the device during the first tests, and the abnormal baseline may be characterized according to an average, a frequency, a standard deviation, or the like, of different behaviors of the device during the second tests.

For example, a new event that never occurred before in a "camera" test but had occurred in a "home" test may be reported as an abnormal event, may be included in an alert to the user, or the like. As an example, if a "camera" test is executed, and the testing agent records that in addition to invoking a camera library, the CPU utilization above 70%, and such CPU utilization was never before recorded in the context of a "camera" test, an invocation of a camera library, or the like, then the testing agent may issue a warning. In some exemplary embodiments, the warning may be provided in real time, may be logged, may be included in a report generated after the test execution is completed, may be included in a report after all the tests are executed in post-factum, or the like.

In some exemplary embodiments, normal or abnormal behavior baselines may be identified based on differences between the events log and the corresponding test results in the results log. In some exemplary embodiments, the events log and the results log may be analyzed to identify tests that officially resulted successfully in the results log, but have one or more abnormal side effects in the events log which indicate that the tests failed in reality. In some cases, such an identification may enhance the testing phase by providing more accurate testing results. For example, a test with acceptable inputs that results with the correct output may contradict recorded events that may describe problematic side effects, prove that the test actually failed, or the like. Accordingly, instead of utilizing the test and its recorded events to characterize normal behavior, the test and its recorded events may be utilized to characterize abnormal behavior of the device.

In some exemplary embodiments, normal or abnormal behavior baselines may be identified based on any other analyzation of the events log and the corresponding test results in the results log.

On Step 230, based on the baseline of normal and abnormal behavior, a blacklist and whitelist may be generated. In some exemplary embodiments, events in the merged file may be classified as normal, potentially abnormal, or abnormal based on the determined baselines. In some exemplary embodiments, a baseline may include a certain threshold or condition, and events may be matched to the baseline according its threshold or condition. For example, a normal baseline of CPU usage during a camera operation may include a CPU usage of up to 10% of the CPU. Accordingly, the whitelist may include camera operations, such as invoking a camera library, that utilize up to 10% of the CPU. In some exemplary embodiments, vulnerabilities of the firmware may be determined based on a determined baseline of normal or abnormal behavior of the firmware.

On Step 240, the blacklist and whitelist are provided, e.g., to a server, a computing device, a component of the device, a runtime agent, or the like. In some cases, the blacklist and whitelist may be utilized, e.g., by the runtime agent, so that when a problematic event occurs, such an event may be automatically reported and its activity is blocked at runtime, while normal or acceptable events may be identified at runtime and ignored. In some exemplary embodiments, each entry of the blacklist or whitelist may indicate a combination of one or more events and states of the device, e.g., providing a full context that enables to identify normal or abnormal behaviors of the device. For example, utilizing a high amount of memory may be permissible in a certain context, e.g., a communication attempt, but not in a different context, e.g., a camera usage.

Figure 3:
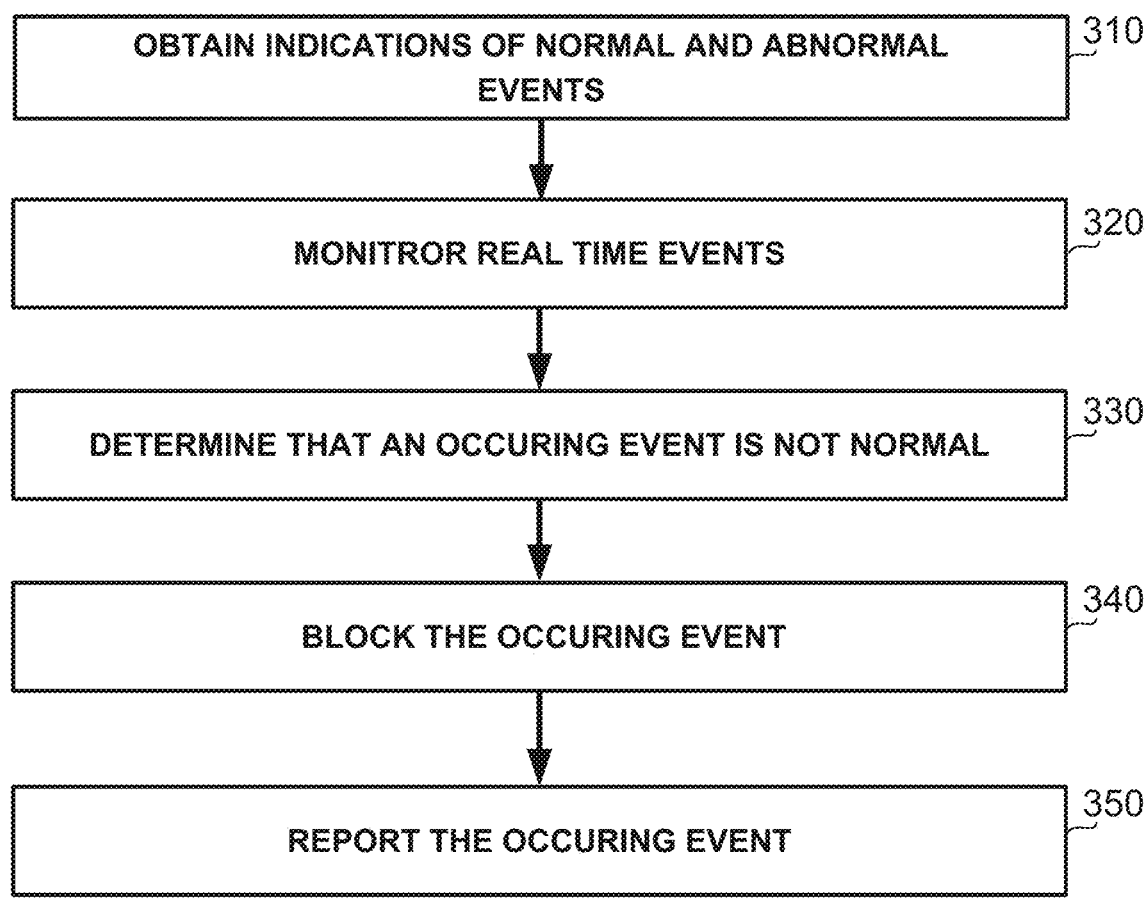
FIG. 3 shows a flowchart diagram of a method, in accordance with some exemplary embodiments of the disclosed subject matter.

Referring now to FIG. 3 showing a flowchart diagram illustrating a method in accordance with some exemplary embodiments of the disclosed subject matter.

On Step 310, after the testing phase, the runtime agent obtains indications of normal and abnormal events, e.g., from the testing agent of FIG. 1. In some exemplary embodiments, the indications may include a whitelist and a blacklist which may retain a description of normal an abnormal behavior. In some exemplary embodiments, the whitelist and the blacklist may include events and a context thereof, such as an ordered set of events, parameters or states recorded in parallel to the events, or the like. The whitelist and blacklist may be obtained and determined based on the monitored events recorded in the events log by the testing agent. In some exemplary embodiments, since test names and types are not relevant after the testing phase, the whitelist and the blacklist may not directly relate to test names or types, but rather to related events and states of the device. In some exemplary embodiments, the runtime agent may be a software which is similar to the testing agent but may run outside of a testing environment, e.g., after employing the testing agent. The runtime agent may be executed on the device when the device is performing its designated operations, thus causing the runtime agent to monitor real-life activities of the device when it is being used by its actual users.

In some exemplary embodiments, the runtime agent may obtain a whitelist of events that are permitted, a blacklist of events and operations that are not permitted, or the like. The lists may be stored on a local file system, on a storage device that is connected to the IoT device, on a cloud server, or the like. In some exemplary embodiments, the lists may be obtained using Internet protocol such as but not limited to (Secure) Hyper Text Transfer Protocol (HTTP(s)), File Transfer Protocol (FTP), TFTP, NFS, or the like. In some exemplary embodiments, the whitelist and the blacklist may be located on a single file, on one or more separate files, or the like.

In some exemplary embodiments, the runtime agent may re-obtain the whitelist and the blacklist periodically, upon an occurrence of an event, or the like. The list may be updated by other runtime agents that discover vulnerabilities, by testing agents running tests, by users, by a combination thereof, or the like. Updated whitelists and blacklists may enable the device to better handle new threats. As an example, a new malware may try to connect to some IP address in order to further download malicious code. The IP address that the malware is trying to connect to may be added to the blacklist. By adding the IP address to the blacklist, the runtime agent may block the malware and defend the device.

In some exemplary embodiments, adding entries to the whitelist may enable new features of the device. An updated whitelist may include a process with features that are installed on the device but blocked. As an example, a device may have the capability to use a light sensor in order to compare different levels of lights and report such differences to users. It may be that that feature is allowable only to premium users and requires extra payment. The manufacturer of the device may send a new whitelist to devices owned by premium users, allowing the feature to run.

In some exemplary embodiments, the runtime agent and its communications may be secured using one or more security techniques. In some exemplary embodiments, one security technique may include encrypting and obfuscating the code of the runtime agent to prevent reverse engineering. In some exemplary embodiments, a security technique may include encrypting the runtime agents' communications. In some exemplary embodiments, a security technique may include utilizing anti-tampering techniques for the runtime agent. In some exemplary embodiments, a security technique may include avoiding from reporting in real time from the runtime agent, e.g., to confuse attackers who try to see which of their attempts causes reports. In some exemplary embodiments, another security technique may include using anti debugging techniques in order to block changes in the runtime agent itself. Such anti debugging techniques may comprise methods that are used for installing the testing agent. As an example, a malicious hacker may dump the software of the device with the runtime agent in order to make changes. Additionally or alternatively, a malicious hacker may connect the device with the runtime agent to a console by using Universal Asynchronous Receiver-Transmitter (UART) in order to change the booting sequence and to run a modified kernel. To eliminate such risks, the runtime agent may hold a checksum of the Kernel and of the software, calculate anew checksum of the kernel and of the software after each boot and compare the two checksums in order to detect and prevent changes. In some exemplary embodiments, during execution of an updated firmware, e.g., together with a configured runtime agent, the updated firmware may not be susceptible to identified vulnerabilities.

On Step 320, real time events in the device may be monitored. In some exemplary embodiments, during a normal operational mode of the device, outside of a testing environment, the runtime agent may monitor events of the device, e.g., using call back functions, event hooks, or the like. In some exemplary embodiments, the runtime agent may be configured to monitor the states and activities of the device in a less intrusive manner than the testing agent, e.g., to identify abnormal events or undefined events.

In some cases, the runtime agent may collect information about undefined events and operations that are not indicated as normal or abnormal events. The undefined events and operations may include events that were not exhibited during the testing phase, and thus were not monitored by the testing agent. Such events may be of interest to the producer of the runtime agent, the producer of the device, or the like. In some exemplary embodiments, undefined events of interest may be reported to a server to be analyzed, e.g., to identify new vulnerabilities.

In some exemplary embodiments, the runtime agent may or may not take an action when real time events occur. In some exemplary embodiments, the runtime agent may determine a response to occurring events based on whether or not they are listed in the whitelist or in the blacklist. In some exemplary embodiments, the runtime agent may block abnormal events from the blacklist and undefined events, for example, to prevent such events from being utilized for malicious purposes. Additionally or alternatively, the runtime agent may report the abnormal or undefined events, in real-time, in retrospect, periodically, or the like. In some exemplary embodiments, the runtime agent may ignore normal events from the whitelist. As an example, the runtime agent may identify an event of attempting to open a connection to an unfamiliar address (e.g., address that was not encountered before). In that case, the runtime agent may block the connection attempt and report it to the user. As another example, the device may attempt to start an unfamiliar software process (e.g., a process that was never recorded as being executed on the device). In that case, the runtime agent may block the attempt to prevent the process from being invoked or executed, and report the encounter to the user.

On Step 330, an occurring event may be determined as not being a normal event. In some exemplary embodiments, the runtime agent may determine that an operation which is not listed in the whitelist, has occurred. Such decision may be as a result of detecting an operation that is not in the whitelist of permitted operations, or that is in the blacklist. As an example, the runtime agent may record that the device's software is trying to send data to a remote server that has an IP address such as "121.3.3.35", which was never been seen or used before by the testing agent and hence it is not on the list of permitted addresses. Additionally or alternatively, the operation and or the address may be on the blacklist.

On Step 340, the occurring event, associated processes, or the like, may be blocked. Referring to the above-mentioned example, the runtime agent may block traffic from the device to the non-permitted IP address "121.3.3.35". In some cases, the event itself may not be blocked, for example, when the event relates to a state of the device such as a change in a CPU level, a storage usage level, or the like. In such cases, related processes of the device may be blocked, thereby changing the state of the device. In some exemplary embodiments, the non-permitted occurring event may be a result of malicious software that is running on the device. Additionally or alternatively, the device may be monitored by an attacker or the like, resulting in the non-permitted occurring event.

On Step 350, the occurring event may be reported. In some exemplary embodiments, the runtime agent may report a non-permitted operation via a report, an alert, a warning, a security warning, or the like. Such reporting may be periodic, in real-time, in retrospect, or the like. In some cases, reporting may be performed periodically as a means to hide the cause of the report from the attacker. For example, the attacker may know that an attempt to open a communication channel to some address was made. However, the attacker will not be able to correlate the non-permitted operation with the report. In some exemplary embodiments, different reporting may be implemented for blacklisted events than to other events that are not within the whitelist. For example, blacklisted events may be reported in a real-time manner, as indicating verified attack attempts, while events that are not whitelisted may be blocked and logged for future analysis, in a non-real-time manner.

Figure 4:
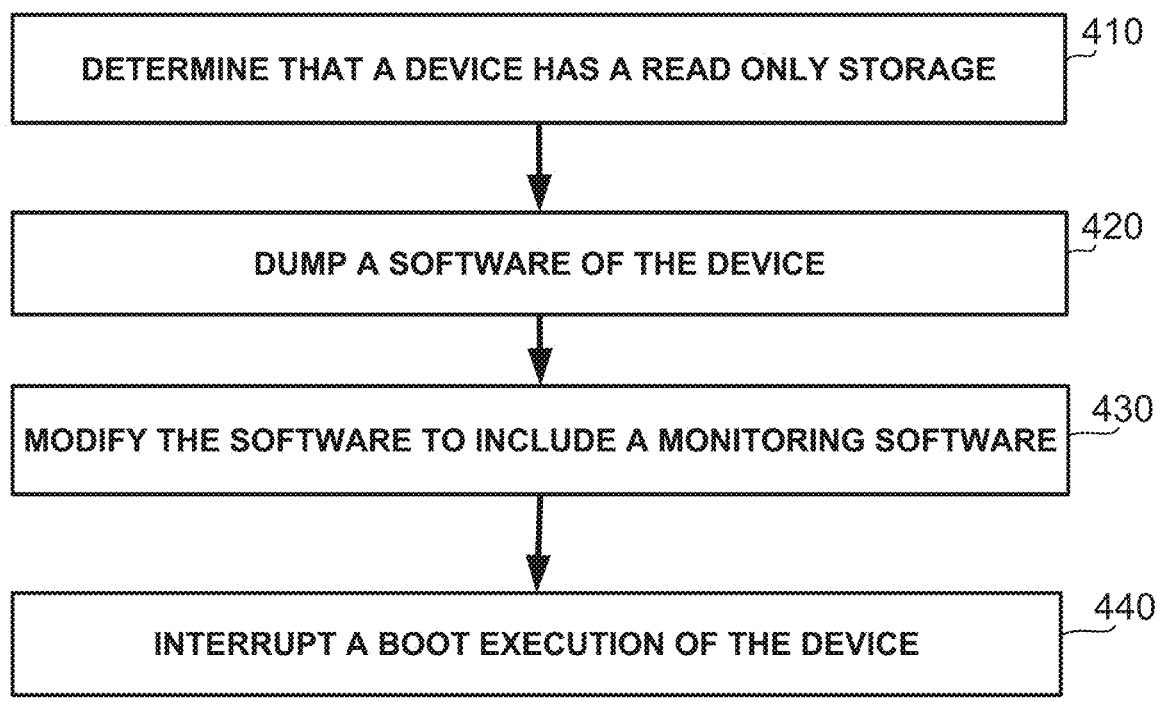
FIG. 4 shows a flowchart diagram of a method, in accordance with some exemplary embodiments of the disclosed subject matter.

Referring now to FIG. 4 showing a flowchart diagram illustrating a method in accordance with some exemplary embodiments of the disclosed subject matter.

On Step 410, an original firmware of the device may be determined to have a read only storage unit. In some exemplary embodiments, the read only storage unit may retain software including an original version of the firmware. In some cases, the device may not enable any modification to its system, such as adding an executable of the testing agent or the runtime agent to the system, e.g., since the device may include a read-only storage unit.

On Step 420, the device's software, including the original firmware of the device, may be dumped or copied to a new location such as a server, a computing device, the RAM of the device, or the like. In some exemplary embodiments, the device's software may be dumped by using one or more hardware extraction tools, an automatic dumper, or the like, such as Joint Test Action Group (JTAG) and Open On-Chip Debugger (OpenOCD). In some exemplary embodiments, the device's software may include the kernel of the device, the drivers of the device, the firmware and software that may perform the device designated operations, or the like.

On Step 430, the original firmware of the device in the new location may be modified to include a monitoring agent, e.g., the testing agent, the runtime agent, or the like. In some exemplary embodiments, after dumping the device's software, the monitoring software may be inserted to the dumped software, e.g., to provide a modified version of the software. For example, the software may be modified to include the testing agent's executable. In some exemplary embodiments, the modified version of the firmware may comprise a computer executable program that comprises the testing agent, the runtime agent, or the like. In some exemplary embodiments, the modified software may be fetched by using Network File System NFS, Trivial File Transfer Protocol (TFTP), or the like. In some exemplary embodiments, the modified software may be loaded into memory and its loading may be commenced.

In some exemplary embodiments, after dumping the device's software, the modified version of the firmware, e.g., including the testing agent's executable, may be loaded to the RAM unit. In some exemplary embodiments, the modified software may be installed on the device permanently or temporarily, such as loaded to volatile memory (e.g., RAM) to be used during the present execution thereof. In some cases, the modified software, which may comprise the testing agent's executable, may be stored on a server such as a remote server. The device may be connected to a console terminal via UART, a Universal Serial Bus (USB) or the like.

On Step 440, after powering on the device, the execution of the boot loader may be stopped, interrupted, or the like. The modified version of the software may be booted, e.g., thereby executing the testing agent, the runtime agent, or the like. In some exemplary embodiments, the modified software may comprise a computer executable program that comprises the testing agent, the runtime agent, or the like. In some exemplary embodiments, the modified version of the firmware may be booted, e.g., thereby executing the testing agent.

In some exemplary embodiments, the testing agent, the runtime agent, or the like, may be loaded and executed upon the kernel being loaded. In some cases, the boot sequence may be loading of a boot loader, loading of a kernel, loading of a file system, and loading of other software components. In some exemplary embodiments, the kernel, file system, other software components may be replaced by performing instructions from the console terminal before being loaded. After the replacement of the kernel and any other components, the loading sequence may be allowed to continue to load the modified software. In some exemplary embodiments, upon a next booting of the device, the original, non-modified software may be loaded. In some exemplary embodiments, stopping of the boot loader may be done by using a boot loader tool (such as a U-Boot) from the console terminal, or from any other program or system. Upon booting the device, the boot execution may be interrupted to replace the software with a modified software, which may be obtained from an external storage such as a server. In some exemplary embodiments, the modified software may be loaded to the RAM unit.

In some exemplary embodiments, Steps 420-440 may be performed separately for the testing agent and the runtime agent. For example, the testing agent may be inserted to the dumped software and booted, and subsequently, the runtime agent may be inserted to the dumped software and booted. In other cases, Steps 420-440 may be performed once for both agents together, for only one of them, or the like.

Figure 5:
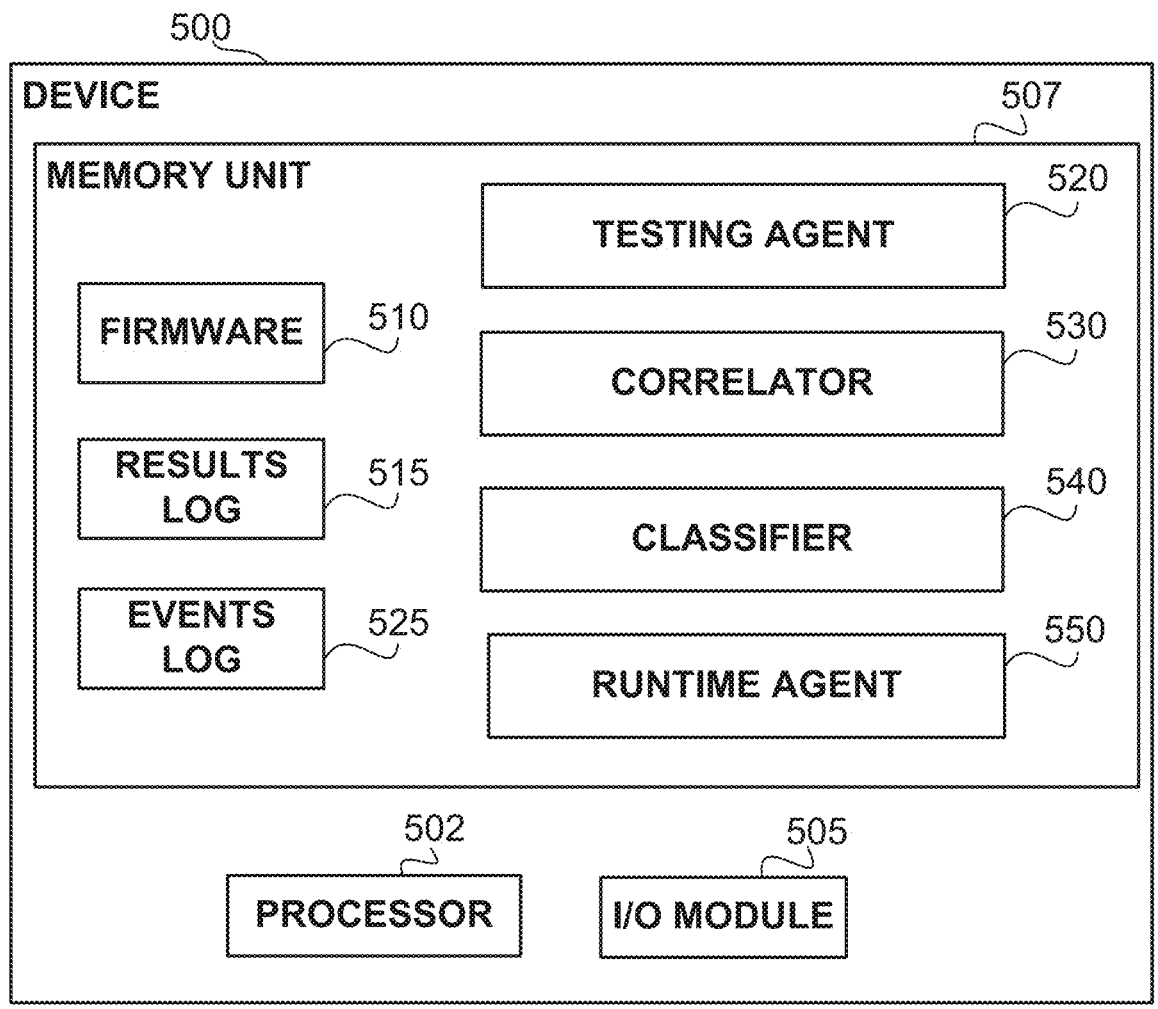
FIG. 5 shows a block diagram of an apparatus, in accordance with some exemplary embodiments of the disclosed subject matter.

Referring now to FIG. 5 showing a block diagram of components of a device, in accordance with some exemplary embodiments of the disclosed subject matter.

In some exemplary embodiments, Device 500 may include an IoT device, an embedded system, a consumer appliance, a computer, a computer peripheral, a computing device, or the like. In some exemplary embodiments, Device 500 may include a Firmware 510 which may have one or more vulnerabilities and a Processor 502. Processor 502 may be a Central Processing Unit (CPU), a microprocessor, an electronic circuit, an Integrated Circuit (IC) or the like. Processor 502 may be utilized to perform computations required by Device 500 or any of its subcomponents.

In some exemplary embodiments, Device 500 may include one or more sensors and communication abilities enabling Device 500 to communicate, directly or indirectly, with the Internet. In some cases, Device 500 may be associated with a physical object and not with a user. In some cases, Device 500 may be used for biometric monitoring of a person, such as sleep monitoring, activity monitoring, or the like. In some exemplary embodiments, Device 500 may be pre-installed with Firmware 510 and a user may not install different software thereon. Additionally or alternatively, Device 500 may be configured to operate without a user interface. In some cases, a user interface may be provided to a user via a user-device such as her mobile device that may connect to a cloud-computing platform which is in communication with Device 500.

In some exemplary embodiments, Device 500 may be connected to a designated web server. In many cases, Device 500 may be in communication with a web server. Device 500 may report to the web server. Additionally or alternatively, Device 500 may receive instructions from the web server. In some exemplary embodiments, the web server may be utilized to receive information from and control many different instances of Device 500.

In some exemplary embodiments of the disclosed subject matter, Device 500 may comprise an Input/Output (I/O) Module 505. I/O Module 505 may be utilized to provide an output to and receive input, e.g., from a user, a network, a computing device, a server, or the like. I/O Module 505 may be operatively coupled to Firmware 510 which may be intended for verification. I/O Module 505 may be operatively coupled to any peripheral device for receiving user input or providing user output. In some exemplary embodiments, I/O Module 505 may be used to transmit and receive information to and from the user, or any other apparatus in communication therewith.

In some exemplary embodiments, Device 500 may comprise a Memory Unit 507. Memory Unit 507 may be a short-term storage device or long-term storage device. Memory Unit 507 may be a persistent storage or volatile storage. Memory Unit 507 may be a disk drive, a Flash disk, a Random Access Memory (RAM), a memory chip, or the like. In some exemplary embodiments, Memory Unit 507 may retain program code operative to cause Processor 502 to perform acts associated with any of the subcomponents of Device 500. In some cases, Memory Unit 507 may comprise a read only, locked storage unit. In other cases, Memory Unit 507 may comprise a modifiable, read/write, unlocked storage unit.

In some exemplary embodiments, Device 500 may comprise a firmware product such as Firmware 510. Firmware 510 may provide low-level control for a specific hardware of Device 500. Firmware 510 may provide a standardized operating environment for more complex software installed on Device 500 (e.g., allowing more hardware-independence). As an example, Firmware 510 may implement a control over a specific hard drive, while another program may be able to store information in and retrieve information from the hard drive by utilizing Firmware 510's capabilities and without directly instructing the hard drive itself. Additionally, or alternatively, for less complex devices, Firmware 510 may act as Device 500's complete operating system, performing all control, monitoring and data manipulation functions, and directly controlling its hardware. Firmware 510 may have one or more vulnerabilities, at least one vulnerability not being detectable by a testing phase. In some exemplary embodiments, Firmware 510 may be executed on Device 500.

The components detailed below may be implemented as one or more sets of interrelated computer instructions, executed for example by Processor 502 or by another processor. The components may be arranged as one or more executable files, dynamic libraries, static libraries, methods, functions, services, or the like, programmed in any programming language and under any computing environment.

Testing Agent 520 may be embedded in a software product separated from Firmware 510 and executed together therewith on Device 500, or the like. Testing Agent 520 may be configured to collect and record internal events of Device 500 in an Events Log 525 during a testing phase.

The tests may be obtained from a database, provided by a developer, a server, a network, or the like. In some cases, Testing Agent 520 may be configured to apply the tests during an execution of Firmware 510 on Device 500. Testing Agent 520 may obtain a test template and generate tests based thereon during the testing phase. In other exemplary embodiments, a third party such as a remote server, a developer, a computing device, or the like, may apply the tests of the testing phase to Device 500. In some exemplary embodiments, testing results from the testing phase may be recorded, kept, written, or the like, in a Results Log 515. In some exemplary embodiments, the tests may include first tests with permitted output, and second tests with forbidden output. In some exemplary embodiments, during execution of the first and second tests, Testing Agent 520 may poll internal events of Device 500 and record in Events Log 525 any change in Device 500, any state of Device 500, action of Device 500, or the like, in a continuous or in a periodical manner.

Correlator 530 may be configured to correlate between Events Log 525 and Results Log 515, e.g., based on timestamps. In some exemplary embodiments, Correlator 530 may obtain Events Log 525 and Results Log 515, e.g., from Testing Agent 520, from I/O Module 505, or the like. Correlator 530 may merge Events Log 525 and Results Log 515 to a merged file, in which each test instance is kept with its associated information from both Events Log 525 and Results Log 515. For example, a test instance may be logged in Results Log 515 with associated information such as the test name, the result, the input, the test content, timestamps of a start and end of the test, or the like. Additionally, Testing Agent 520 may log the same test instance in Events Log 525 with associated information such as internal events that occurred in Device 500 during the execution of the test instance. In some exemplary embodiments, based on the timestamps of the internal events recorded in Events Log 525, Correlator 530 may create a new entry in the merged file that includes the name of the test instance and its associated information from both logs. In some exemplary embodiments, Correlator 530 may be located in Device 500, in a server, in a computed device, or the like.

Classifier 540 may obtain the merged file, e.g., from Correlator 530, from I/O Module 505, or the like. In some exemplary embodiments, Classifier 540 may be configured to classify test instances from the merged file into test groups based on the test name, test type, or the like. For example, Classifier 540 may classify test instances that are of test type "camera" into one test group. In some exemplary embodiments, Classifier 540 may analyze every test group based on a type of input, e.g., permitted or forbidden input, based on test results, based on recorded events, based on contradictions between the test results and the recorded events, or the like, to determine a baseline of normal and abnormal behavior of the device for the test group. In some exemplary embodiments, Classifier 540 may utilize the baseline of normal and abnormal behavior of the device to create a whitelist of permitted events and a blacklist of forbidden events. In some exemplary embodiments, Classifier 540 may detect one or more vulnerabilities of Firmware 510 based on the baseline of normal and abnormal behavior of the device. In some exemplary embodiments, Classifier 540 may be located in Device 500, in a server, in a computed device, or the like.

Runtime Agent 550 may obtain the whitelist of permitted events and the blacklist of forbidden events, e.g., from Classifier 540, from I/O Module 505, or the like. In some exemplary embodiments, Runtime Agent 550 may be embedded in a software product separated from Firmware 510 and executed together therewith on Device 500, or the like. Runtime Agent 550 may protect Firmware 510 against exploitation of specific vulnerabilities during the execution thereof on Device 500, e.g., after the testing phase. Runtime Agent 550 may be configured to utilize one or more event hooks, call backs, or the like, to monitor real time events in Device 500.

In some exemplary embodiments, upon identifying a real time event, Runtime Agent 550 may compare the real time event to the blacklist and to the whitelist. Based on the comparison, Runtime Agent 550 may determine whether or not one or more remedial actions are to be performed. In some exemplary embodiments, if the real time event is listed in the whitelist, Runtime Agent 550 may not record the real time event and not perform any remedial action. In some exemplary embodiments, if the real time event is listed in the blacklist, or not listed at all, Runtime Agent 550 may record the real time event and perform remedial actions such as blocking the real time event, reporting the real time event, or the like. In some exemplary embodiments, a report of a real time event that is listed in the blacklist may include additional information about the real time event, e.g., obtained from the blacklist.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
during a testing phase of a firmware being executed by a device, monitoring states and activities of the device, wherein said monitoring is performed by a testing agent that is functionally separate from the firmware;
recording in a log, by the testing agent, at least one event that is associated with the states or the activities of the device, and a timestamp of the at least one event;
based on the timestamp of the at least one event, correlating between the at least one event and one or more results of the testing phase; and
based on said correlating, determining one or more vulnerabilities of the device;
wherein the testing phase comprises one or more test instances having a test name, wherein the one or more results comprise the test name and testing results of the one or more test instances, wherein a timestamp of the at least one event correspond to timestamps of the one or more test instances, wherein said correlating comprises associating the test name with the at least one event and with the testing results, wherein, based on said associating, performing an analysis of the test name to determine normal and abnormal behaviors of the device during tests associated with the test name.

2. The method of claim 1, wherein a vulnerability of the one or more vulnerabilities is indicated by a combination of two or more recorded events in the log.

3. The method of claim 1, wherein a vulnerability of the one or more vulnerabilities indicates that at least one result of the one or more results is incorrect.

4. A method comprising:
during a testing phase of a firmware being executed by a device, monitoring states and activities of the device, wherein said monitoring is performed by a testing agent that is functionally separate from the firmware;
recording in a log, by the testing agent, at least one event that is associated with the states or the activities of the device, and a timestamp of the at least one event;
based on the timestamp of the at least one event, correlating between the at least one event and one or more results of the testing phase;
wherein the testing phase comprises one or more test instances having a test name, wherein the one or more results comprise the test name and testing results of the one or more test instances, wherein a timestamp of the at least one event correspond to timestamps of the one or more test instances, wherein said correlating comprises associating the test name with the at least one event and with the testing results;
detecting normal and abnormal behaviors associated with different events of the test name;
determining a baseline of abnormal behavior based on said detecting; and
determining the one or more vulnerabilities based on the baseline and based on said correlating.

5. A method comprising:
during a testing phase of a firmware being executed by a device, monitoring states and activities of the device, wherein said monitoring is performed by a testing agent that is functionally separate from the firmware;
recording in a log, by the testing agent, at least one event that is associated with the states or the activities of the device, and a timestamp of the at least one event;
classifying one or more test instances in the testing phase as belonging to a test type;
based on the timestamp of the at least one event, correlating between the at least one event and one or more results of the testing phase, wherein said correlating comprises associating the test type to testing results of the one or more test instances and to one or more events in the log, wherein the one or more events correspond to timestamps of the one or more test instances;
detecting normal and abnormal behaviors associated with the test type, and determining the one or more vulnerabilities based on the normal and the abnormal behaviors.

6. The method of claim 5, wherein the states or the activities of the device comprise at least one of the group consisting of: a file access event, an input or output (I/O) event, a resource consumption event, a change in the storage state, a socket utilization event, a port utilization event, a network communication event, a permission modification event, and a process modification event.

7. A computerized apparatus having a processor and coupled memory, the processor being adapted to perform the steps of:
during a first testing phase configured to test a firmware of a device with a first test having a test name, recording in a log a first parameter associated with a state of the device during the first test, and a first timestamp of the first parameter, wherein the first test comprises permitted input;
during a second testing phase configured test the firmware of the device with a second test having the test name, recording in the log a second parameter associated with the state of the device, and a second timestamp of the second parameter, wherein the second test comprises forbidden input;
based on the first timestamp, correlating results of the first test with the first parameter;
based on the second timestamp, correlating results of the second test with the second parameter; and
characterizing normal and abnormal states of the device at least based on a difference between the first and second parameters, wherein said characterizing comprising characterizing the normal states of the device to include the first parameter, and characterizing the abnormal states of the device to include the second parameter.

8. The computerized apparatus having a processor and coupled memory, the processor being adapted to perform the steps of:
during a first testing phase configured to test a firmware of a device with a first test having a test name, recording in a log a first parameter associated with a state of the device during the first test, and a first timestamp of the first parameter, wherein the first test comprises permitted input;
during a second testing phase configured test the firmware of the device with a second test having the test name, recording in the log a second parameter associated with the state of the device, and a second timestamp of the second parameter, wherein the second test comprises forbidden input;
based on the first timestamp, correlating results of the first test with the first Parameter;
based on the second timestamp, correlating results of the second test with the second parameter; and
characterizing normal and abnormal states of the device at least based on a difference between the first and second parameters, wherein said characterizing the normal and the abnormal states of the device is based at least on a contradiction between the first parameter and the results of the first test.

9. The computerized apparatus of having a processor and coupled memory, the processor being adapted to perform the steps of:
during a first testing phase configured to test a firmware of a device with a first test having a test name, recording in a log a first parameter associated with a state of the device during the first test, and a first timestamp of the first parameter, wherein the first test comprises permitted input;
during a second testing phase configured test the firmware of the device with a second test having the test name, recording in the log a second parameter associated with the state of the device, and a second timestamp of the second parameter, wherein the second test comprises forbidden input;
based on the first timestamp, correlating results of the first test with the first parameter;
based on the second timestamp, correlating results of the second test with the second parameter;
characterizing normal and abnormal states of the device at least based on a difference between the first and second parameters; and
identifying a vulnerability of the firmware based on said characterizing the normal and the abnormal states of the device.

10. A non-transitory computer readable medium retaining program instructions, which program instructions, when read by the processor, cause the processor to perform:
during a testing phase of a firmware of a device, continuously polling states and activities of the device, wherein said polling is at a testing agent that is functionality separate from the firmware;
correlating between at least one event that is associated with the states or the activities of the device and test results of the testing phase;
based on said correlating, determining for the firmware one or more normal events and one or more abnormal events; and
after the testing phase, providing indications of the one or more normal events and one or more abnormal events from the testing agent to a runtime agent, whereby said providing enables the runtime agent to protect the firmware from vulnerabilities associated with the one or more abnormal events; and
generate a report based on an identification by the runtime agent of a real time event in the firmware that is indicated as abnormal by the indications, wherein the report comprises recorded states and activities of the device associated with the real time event.

11. The non-transitory computer readable medium of claim 10,
wherein the runtime agent is configured to utilize event hooks to detect real time events of the firmware and to compare the real time events to the provided indications to determine whether or not a remedial action is to be performed in response to the real time events.

12. The non-transitory computer readable medium of claim 10, wherein the runtime agent is configured to be executed on the device when the device is in a non-testing phase, wherein the runtime agent is configured to perform:
classifying a real time event as normal or abnormal based on the indications,
upon determining that the real time event is a normal event, ignoring the real time event, and
upon determining that the real time event is an abnormal event, blocking the real time event.

13. The non-transitory computer readable medium of claim 10, wherein said correlating is based on a timestamp.

14. A non-transitory computer readable medium retaining program instructions, which program instructions when read by a processor, cause the processor to perform the steps of:
during a testing phase of a firmware of a device, continuously polling states and activities of the device, wherein said polling is at a testing agent that is functionality separate from the firmware;
correlating between at least one event that is associated with the states or the activities of the device and test results of the testing phase;
based on said correlating, determining for the firmware one or more normal events and one or more abnormal events; and
after the testing phase, providing indications of the one or more normal events and one or more abnormal events from the testing agent to a runtime agent, whereby said providing enables the runtime agent to protect the firmware from vulnerabilities associated with the one or more abnormal events, wherein the runtime agent is configured to perform:
identifying a real time event using one or more event hooks;
determining that the real time event was not specified in the indications from
the testing agent; and
reporting the real time event to enable a discovery of a new vulnerability in the firmware.

15. A non-transitory computer readable medium retaining program instructions, which program instructions when read by a processor, cause the processor to perform the steps of:
during a testing phase of a firmware of a device, continuously polling states and activities of the device, wherein said polling is at a testing agent that is functionality separate from the firmware;
correlating between at least one event that is associated with the states or the activities of the device and test results of the testing phase;
based on said correlating, determining for the firmware one or more normal events and one or more abnormal events; and
after the testing phase, providing indications of the one or more normal events and one or more abnormal events from the testing agent to a runtime agent, whereby said providing enables the runtime agent to protect the firmware from vulnerabilities associated with the one or more abnormal events, wherein the runtime agent is configured to monitor the states and activities of the device in a less intrusive manner than the testing agent.

16. A non-transitory computer readable medium retaining program instructions, which program instructions, when read by the processor, cause the processor to:
determine a type of the device; and
based on the type of the device, determine a testing policy;
during a testing phase of a firmware of a device, continuously polling states and activities of the device, wherein said polling is at a testing agent that is functionality separate from the firmware, wherein the testing phase is configured to implement the testing policy;
correlating between at least one event that is associated with the states or the activities of the device and test results of the testing phase;
based on said correlating, determining for the firmware one or more normal events and one or more abnormal events; and
after the testing phase, providing indications of the one or more normal events and one or more abnormal events from the testing agent to a runtime agent, whereby said providing enables the runtime agent to protect the firmware from vulnerabilities associated with the one or more abnormal events.

17. A non-transitory computer readable medium retaining program instructions, which program instructions when read by a processor, cause the processor to perform the steps of:
during a testing phase of a firmware of a device, continuously polling states and activities of the device, wherein said polling is at a testing agent that is functionality separate from the firmware;
correlating between at least one event that is associated with the states or the activities of the device and test results of the testing phase;
based on said correlating, determining for the firmware one or more normal events and one or more abnormal events; and
after the testing phase, providing indications of the one or more normal events and one or more abnormal events from the testing agent to a runtime agent, whereby said providing enables the runtime agent to protect the firmware from vulnerabilities associated with the one or more abnormal events;
wherein the device comprises a Random Access Memory (RAM) unit and a read only storage unit, wherein the read only storage unit retains an original version of the firmware, wherein the instructions, when read by the processor, cause the processor to:
interrupt a boot execution of software that is retained in the read only storage unit;
load to the RAM unit, a modified version of the firmware, wherein the modified version of the firmware is a computer executable program that comprises the testing agent; and
boot the modified version of the firmware, whereby executing the testing agent.

* * * * *